United States Patent
Balasubramanian et al.

(10) Patent No.: US 8,855,636 B2
(45) Date of Patent: Oct. 7, 2014

(54) METHODS AND APPARATUS FOR SYSTEM SELECTION IN A MULTIMODE WIRELESS DEVICE

(75) Inventors: Srinivasan Balasubramanian, San Diego, CA (US); Manoj M. Deshpande, San Diego, CA (US); Thomas Klingenbrunn, San Diego, CA (US); Shyamal Ramachandran, San Diego, CA (US); Ramachandran Subramanian, San Diego, CA (US); Arvind Swaminathan, San Diego, CA (US); Young C. Yoon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 12/582,623

(22) Filed: Oct. 20, 2009

(65) Prior Publication Data

US 2010/0099412 A1    Apr. 22, 2010

Related U.S. Application Data

(60) Provisional application No. 61/107,630, filed on Oct. 22, 2008.

(51) Int. Cl.
*H04W 4/00* (2009.01)
*H04W 48/18* (2009.01)

(52) U.S. Cl.
CPC .................................. *H04W 48/18* (2013.01)
USPC ...................................... 455/435.2; 370/331

(58) Field of Classification Search
USPC .......... 455/432.1–435.2, 552.1, 435.3, 550.1, 455/450; 370/331, 349
See application file for complete search history.

(56) References Cited

U.S. PATENT DOCUMENTS

| 2004/0071126 | A1* | 4/2004 | Ramos-Escano et al. .... 370/349 |
| 2004/0192377 | A1* | 9/2004 | Park et al. .................. 455/552.1 |
| 2006/0079224 | A1* | 4/2006 | Welnick et al. ............ 455/432.1 |
| 2006/0234705 | A1* | 10/2006 | Oommen ................... 455/435.3 |

(Continued)

FOREIGN PATENT DOCUMENTS

| CA | 2595740 A1 | 2/2008 |
| CA | 2629471 A1 | 10/2008 |

(Continued)

OTHER PUBLICATIONS

International Search Report & Written Opinion—PCT/US09/061721, International Search Authority—European Patent Office—Feb. 22, 2010.

(Continued)

*Primary Examiner* — Nathan Taylor
(74) *Attorney, Agent, or Firm* — Anthony R. Morris

(57) ABSTRACT

Devices and methods are provided for system selection from a plurality of wireless system access technologies, such as a first group (e.g., 3GPP2 technologies) and a second group (e.g., 3GPP technologies). In one embodiment, the method may involve storing identification information pertaining to the first group in a database, wherein the database may concern the priority of ones of the access technologies pertaining to the second group. The method may also involve selecting a preferred access technology from one of the first and second groups based at least in part on the identification information stored in the database.

44 Claims, 22 Drawing Sheets

(56) References Cited

U.S. PATENT DOCUMENTS

| | | | |
|---|---|---|---|
| 2006/0245392 A1* | 11/2006 | Buckley et al. | 370/331 |
| 2007/0155420 A1* | 7/2007 | Nagaraj et al. | 455/552.1 |
| 2007/0255797 A1* | 11/2007 | Dunn et al. | 709/217 |

FOREIGN PATENT DOCUMENTS

| | | |
|---|---|---|
| CN | 101146362 A | 3/2008 |
| EP | 1740001 | 1/2007 |
| EP | 1740001 A1 | 1/2007 |
| EP | 1885141 | 2/2008 |
| EP | 1885141 A1 | 2/2008 |
| JP | 2008042913 A | 2/2008 |
| RU | 2007105980 A | 8/2008 |
| RU | 2336638 C2 | 10/2008 |

OTHER PUBLICATIONS

Taiwan Search Report—TW098135819—TIPO—Apr. 25, 2013.

* cited by examiner

PRL 1002

Acquisition Table 1004

| INDEX | Network Type | Channel Block |
|---|---|---|
| 0 | Cellular CDMA (Standard Channels) | B |
| 1 | Cellular CDMA (Standard Channels) | A |
| 2 | Cellular Analog | A |
| 3 | Cellular Analog | B |
| 4 | PCS CDMA (Using Channels) | 425 |
| 5 | PCS CDMA (Using Blocks) | F |

System Table — Permitted Systems 1006

| Carrier-System SID/NID | Selection Pref. | Roaming Indicator | Acquisition Index |
|---|---|---|---|
| SID/NID | First | off | 0 |
| SID/NID | Second | on | 1 |
| SID/NID | Second | on | 2 |
| SID/NID | Third | flashing | 4 |

SID/NID to MCC/MNC Mapping Table 1008

|  | SID | NID | MCC | MNC |
|---|---|---|---|---|
| 1 | S1 | N1 | 310 | 2 |

PLMN List 1010

|  | MCC | MNC | Access Technology |
|---|---|---|---|
| 1 | 310 | 1 | LTE (710) |
| 2 | 310 | 2 | 3GPP2 (e.g., 1xEVDO 712) |
| 3 | 310 | 3 | LTE (714) |

High Priority ↑ Low Priority

Acquisition Records

| Acq Type | Band 1 | Ch 1 | Band 2 | Ch2 | Band 3 | Ch 3 |
|---|---|---|---|---|---|---|
| CDMA Generic | 800 MHz | 350 | | | | |
| CDMA PCS | 25 | 50 | 75 | 100 | | |
| CDMA PCS | 125 | 150 | 175 | 200 | | |
| E-UTRA | 700 MHz | 1 | | | | |
| UTRA | I | 1 | I | 2 | III | 1 |
| GSM | 900 MHz | 1 | 900 MHz | 2 | 1900 MHz | 1 |

FIG. 15C

METHODS AND APPARATUS FOR SYSTEM SELECTION IN A MULTIMODE WIRELESS DEVICE

CLAIM OF PRIORITY UNDER 35 U.S.C. §119

The present Application for patent claims priority to Provisional Application No. 61/107,630 entitled "METHODS AND APPARATUS FOR SYSTEM SELECTION IN A MULTIMODE WIRELESS DEVICE," filed Oct. 22, 2008, and assigned to the assignee hereof and hereby expressly incorporated by reference herein.

BACKGROUND

1. Field

The present disclosure relates to methods and apparatus for system selection in a multimode wireless device; and more particularly to system selection in a multimode wireless device which supports multiple standards.

2. Background

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

With the deployment of a multitude of wireless technologies worldwide and support for these technologies in mobile multimode devices or user equipment (UE), there is a growing need for seamless system selection toward the goal of global roaming. Furthermore, any particular geographic region may support mixed technologies and networks, such as $3^{rd}$ Generation Partnership Project (3GPP) and $3^{rd}$ Generation Partnership Project 2 (3GPP2) technologies.

A mobile multimode device that supports mixed technologies may include multiple databases that are used in selecting optimal networks within a technology. As an example, for 3GPP2 technologies, such as certain Code Division Multiple Access 2000 (CDMA2000) networks, a Preferred Roaming List (PRL) database which is stored at the UE provides information about which system/network from 3GPP2 technologies is preferred in a geographic region for that device. Whether predetermined or programmed via over-the-air (OTA) management protocols, the PRL contains information about the preferred networks and the order in which they should be selected for the user. PRLs for 3GPP2 technologies may be structured to have a table associated with each geographical region, which in turn contains a list of system descriptions keyed by system identifier/network identifier (SID/NID) pairs and associated with an acquisition index. The acquisition index may be used as a pointer to an acquisition table which contains an indexed list of RF channels for channel acquisition purposes in the related system.

On the other hand for 3GPP technologies, such as Global System for Mobile (GSM) and Universal Mobile Telecommunication System (UMTS) Terrestrial Radio Access (UTRA), a differently structured database list of preferred networks, termed Public Land Mobile Networks (PLMNs), is stored in a Subscriber Identity Module (SIM) or Universal Subscriber Identity Module (USIM) of the mobile device. The PLMNs in the database include a Mobile Network Code (MNC) that is used in combination with a Mobile Country Code (MCC) (also known as a "MCC/MNC tuple") to uniquely identify a service operator using a 3GPP technology, such as GSM and UMTS public land mobile networks.

The starting point can be the 3GPP approach to system selection based on PLMN lists, which may include 3GPP2 access technology identifiers (ATI), also known as radio access technologies (RATs). A PLMN may identify and may be a concatenation of a MCC and a MNC. When roaming through geographical locations, it is desirable that a multimode device seamlessly select the best available system, particularly when roaming across areas with different available access technologies (e.g., 3GPP and 3GPP2). Accordingly, there is a need for a technique for managing access technology selection for multimode roaming between existing access technologies, as well as possible future access technologies, that effects a more seamless and efficient system selection among the access technologies. Such a technique would go beyond, for example, simply including 3GPP2 RATs in 3GPP RAT, which does not typically enable 3GPP2 system selection. The embodiments described in detail below enable efficient system selection from a plurality of wireless system access technologies.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a method by which a UE performs system selection from a plurality of wireless system access technologies. For example, the plurality of wireless system access technologies may include a first group and a second group of access technologies. The system selection method may involve storing identification information pertaining to the first group in a database, wherein the database may concern the priority of ones of the access technologies pertaining to the second group. The method may also involve selecting a preferred access technology from one of the first and second groups based at least in part on the identification information stored in the database.

The method may involve storing, for each given system of the first group listed in the database, at least one extension bit identifying the given system. The step of storing may involve adding the at least one extension bit to an identifier (e.g., an access technology identifier) associated with the given system in the database. The at least one extension bit may indicate support of the access technologies of the first group.

For example, the first group may comprise 3GPP2 technologies, and the second group may comprise 3GPP technologies. The database may comprise a list of Public Land Mobile Networks (PLMNs) associated with the 3GPP technologies. The method may involve accessing a Preferred Roaming List (PRL) associated with the 3GPP2 technologies, wherein the PRL comprises a system table and an acquisition table.

In one embodiment, the system table of the PRL may include at least one system identifier (SID)/network identifier (NID) combination for at least one of the 3GPP2 technologies. In the alternative, or in addition, the system table of the PRL may include at least one subnet-ID for at least one of the 3GPP2 technologies.

In another embodiment, the system table of the PRL may be adapted to comprise at least one Mobile Country Code (MCC)/Mobile Network Code (MNC) pair for at least one of the 3GPP2 technologies. In related aspects, the method may involve, for a given MCC/MNC pair in the system table, obtaining a corresponding acquisition index from the system table, the acquisition index referring to at least one of the frequencies listed in the acquisition table.

The list of the PLMNs may include at least one MCC/MNC pair for at least one of the 3GPP2 technologies. The method may involve, using the at least one MCC/MNC pair to find at least one of a corresponding SID/NID pair and a corresponding subnet-ID. The method may comprise checking a mapping table that correlates MCC/MNC pairs to corresponding SID/NID combinations.

The method may involve, receiving at least one MCC/MNC pair in at least one Extended System Parameter Message (ESPM) from at least one 3GPP2 system. The method may further involve, storing the at least one received MCC/MNC pair in at least one of the database and the PRL.

The method may involve, using a SID/NID combination in the PRL to find a corresponding MCC/MNC pair, such as, for example, by checking a mapping table that correlates SID/NID combinations to corresponding MCC/MNC pairs. In the alternative, or in addition, the method may involve, using a subnet-ID in the PRL to find a corresponding MCC/MNC pair, such as, for example, by checking a mapping table that correlates subnet-IDs to corresponding MCC/MNC pairs.

The method may involve, consulting at least one of the database and the PRL to resolve priorities among 3GPP and 3GPP2 systems. In related aspects, there is provided an embodiment wherein: the selected preferred access technology corresponds to at least one 3GPP2 system; the at least one 3GPP2 system is not associated with MCC/MNC pairs; and the list of PLMNs includes at least one block entry corresponding to the 3GPP2 technologies. The method may involve, in response to encountering the at least one block entry, (a) performing a full PRL scan to search for all available 3GPP2 technologies and (b) camping on an available 3GPP2 system.

In still another embodiment, the method may involve using GEO and acquisition records listed in the PRL to speed up scans for 3GPP2 systems that are included in the list of the PLMNs. In still another embodiment, the database may comprise a system priority list that is geo-spatial for a particular region. The system priority list comprises a list of PLMNs. The database may comprise a system table and an acquisition table.

In accordance with one or more embodiments and corresponding disclosure thereof, various aspects are described in connection with another method for system selection. The method may involve, storing extension information concerning the first group in a main database, the main database pertaining to the second group. The method may also involve, searching a secondary database concerning priority of ones of the access technologies pertaining to the first group to determine whether a preferred access technology may be selected from the first group for a current geographic location of a UE.

In one embodiment, the first group may comprise 3GPP2 technologies, and the second group may comprise 3GPP technologies. The main database may comprise a PLMN list, and the secondary database may comprise a PRL. In related aspects, the method may involve, consulting a mapping table to translate a first identifier for the preferred access technology of the first group to a corresponding second identifier usable for the second group. For example, the first identifier may comprise a SID/NID combination, and the second identifier may comprise an MNC/MCC pair.

The method may involve, determining whether or not to select the preferred access technology of the first group based at least in part on a PLMN list in the main database. For example, the PLMN list may comprise a preference order, and the method may comprise determining whether or not to select the preferred access technology based at least in part on the preference order.

In accordance with one or more embodiments and corresponding disclosure thereof, various aspects are described in connection with devices and apparatuses for system selection from a plurality of wireless system access technologies, the plurality comprising a first group and a second group. For example, there is provided an apparatus that may be configured as either a UE or as a processor or similar device for use within the UE or similar communication device. The apparatus may comprise an electrical component for storing identification information pertaining to the first group in a database, the database concerning priority of ones of the access technologies pertaining to the second group. The apparatus may comprise an electrical component for selecting a preferred access technology from one of the first and second groups based at least in part on the identification information stored in the database. In related aspects, the identification information may comprise, for each given system of the first group listed in the database, at least one extension bit identifying the given system.

In accordance with one or more embodiments and corresponding disclosure thereof, various aspects are described in connection with another apparatus for system selection from a plurality of wireless system access technologies. In one embodiment, the apparatus may comprise an electrical component for storing extension information concerning the first group in a main database, the main database pertaining to the second group. The apparatus may comprise an electrical component for searching a secondary database concerning priority of ones of the access technologies pertaining to the first group to determine whether a preferred access technology may be selected from the first group for a current geographic location of the device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 10 shows a PRL, PLMN list and mapping table illustrating an example of system selection according to the present disclosure.

FIG. 15C shows one embodiment of an acquisition table that may be used with a flex GEO table of FIG. 15A.

DETAILED DESCRIPTION

Figure 1:
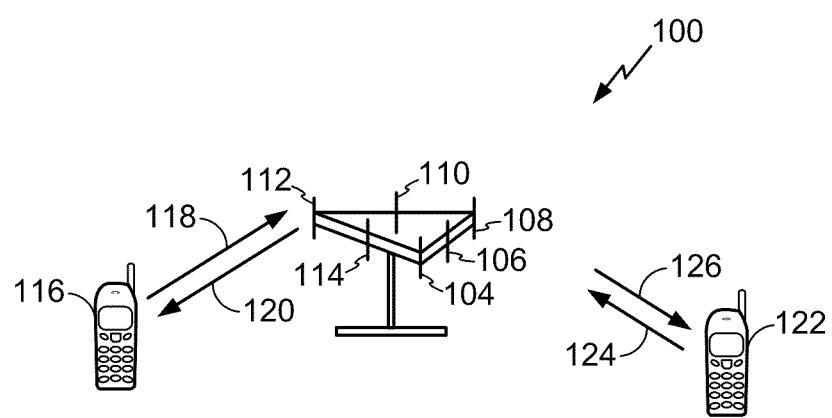
FIG. 1 illustrates a multiple access wireless communication system according to one embodiment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single Carrier Frequency Division Multiple Access (SC-FDMA) systems may utilize single carrier modulation and frequency domain equalization, and may have similar performance and essentially the same overall complexity as those of OFDMA systems. A SC-FDMA signal generally has lower Peak-to-Average Power Ratio (PAPR) because of its inherent single carrier structure. SC-FDMA has drawn great attention, especially for uplink communications where lower PAPR greatly benefits the mobile terminal in terms of transmit power efficiency, and is currently a working assumption for uplink multiple access schemes in 3GPP LTE or Evolved UTRA. For the purposes of the present document, the following abbreviations apply:

AM Acknowledged Mode
AMD Acknowledged Mode Data
ARQ Automatic Repeat Request
BCCH Broadcast Control Channel
BCH Broadcast Channel
CCCH Common Control Channel
CCH Control Channel
CCTrCH Coded Composite Transport Channel
CP Cyclic Prefix
CRC Cyclic Redundancy Check
CTCH Common Traffic Channel
DCCH Dedicated Control Channel
DCH Dedicated Channel
DL Downlink
DL-SCH Downlink Shared Channel
DSCH Downlink Shared Channel
DTCH Dedicated Traffic Channel
FACH Forward link Access Channel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MBSFN Multicast Broadcast Single Frequency Network
MCE MBMS Coordinating Entity
MCH Multicast Channel
MRW Move Receiving Window
MSB Most Significant Bit
MSCH MBMS point-to-multipoint Scheduling Channel
MTCH MBMS point-to-multipoint Traffic Channel
PCCH Paging Control Channel
PCH Paging Channel
PDCCH Physical Downlink Control Channel
PDSCH Physical Downlink Shared Channel
PDU Protocol Data Unit
PHY Physical layer
PhyCH Physical Channel
RACH Random Access Channel
RLC Radio Link Control
RRC Radio Resource Control
SAP Service Access Point
SDU Service Data Unit
SHCCH Shared channel Control Channel
SN Sequence Number
SUFI Super Field
TCH Traffic Channel TDD Time Division Duplex
TFI Transport Format Indicator
TM Transparent Mode
TMD Transparent Mode Data
TTI Transmission Time Interval
UE User Equipment
UL Uplink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network Referring to FIG. 1, a multiple access wireless communication system according to one embodiment is illustrated. An access point 100 (AP) may include multiple antenna groups, one including 104 and 106, another including 108 and 110, and an additional including 112 and 114. In FIG. 1, only two antennas are shown for each antenna group, however, more or fewer antennas may be utilized for each antenna group. Access terminal or user equipment (UE) 116 may be in communication with antennas 112 and 114, where antennas 112 and 114 transmit information to UE 116 over forward link 120 and receive information from UE 116 over reverse link 118. UE 122 is in communication with antennas 106 and 108, where antennas 106 and 108 transmit information to UE 122 over forward link 126 and receive information from UE 122 over reverse link 124. In an FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the AP. In the embodiment, antenna groups each are designed to communicate to UEs in a sector of the areas covered by AP 100. In communication over forward links 120 and 126, the transmitting antennas of AP 100 utilize beamforming in order to improve the signal-to-noise ratio of forward links for the different UEs 116 and 124. Also, an AP using beamforming to transmit to UEs scattered randomly through its coverage causes less interference to UEs in neighboring cells than an AP transmitting through a single antenna to all its UEs.

In accordance with aspects of the embodiments described herein, there is provided a multiple-in-multiple-out (MIMO) system that employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 2:
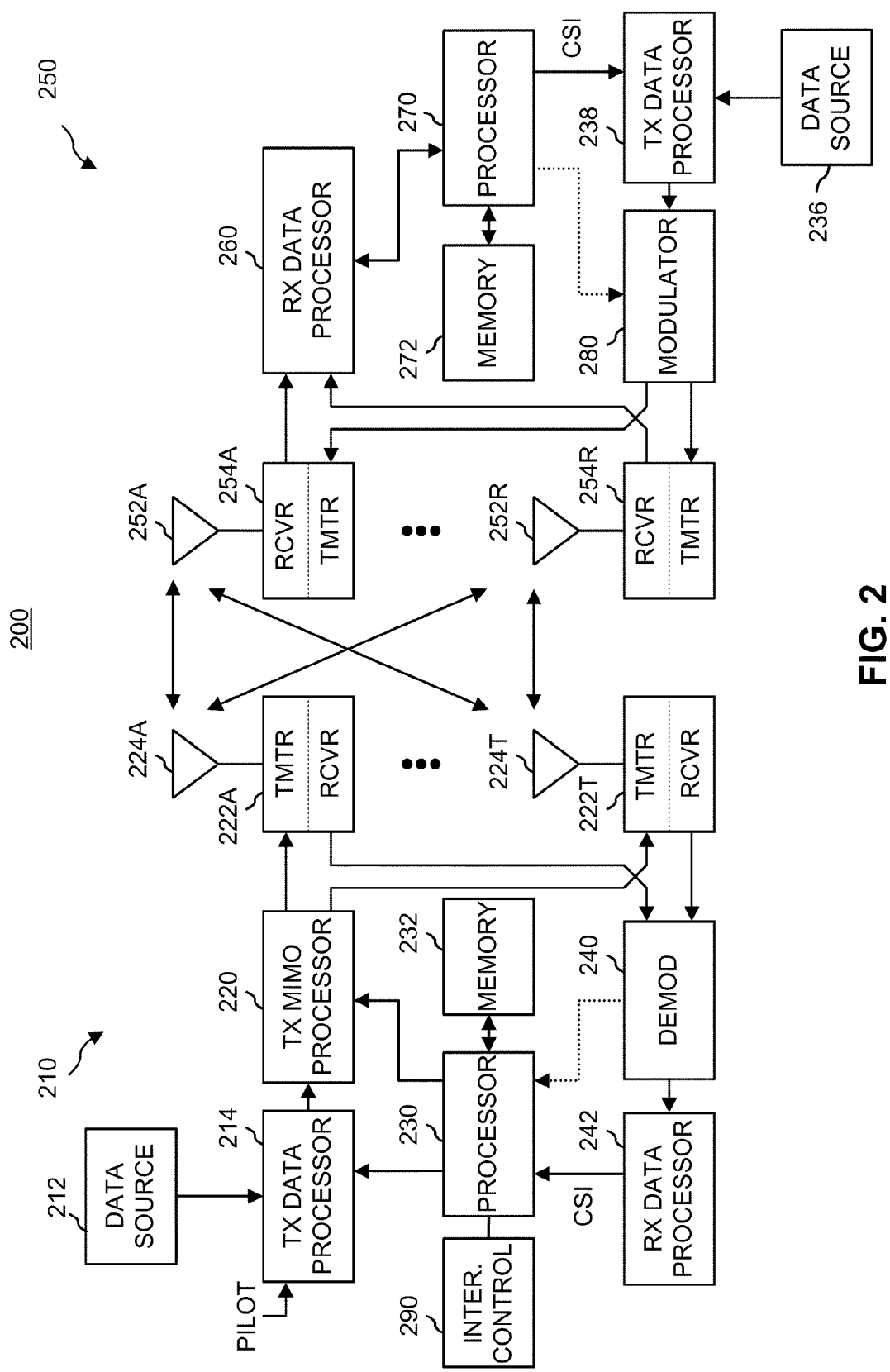
FIG. 2 illustrates a block diagram of a communication system.

The teachings herein may be incorporated into a node (e.g., a device) employing various components for communicating with at least one other node. FIG. 2 depicts several sample components that may be employed to facilitate communication between nodes. Specifically, FIG. 2 illustrates a wireless device 210 (e.g., an access point) and a wireless device 250 (e.g., a UE) of a MIMO system 200. At the device 210, traffic data for a number of data streams is provided from a data source 212 to a transmit ("TX") data processor 214.

In some aspects, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase-Shift Keying (QPSK), M-ary Phase Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230. A data memory 232 may store program code, data, and other information used by the processor 230 or other components of the device 210.

The modulation symbols for all data streams are then provided to a TX MIMO processor 220, which may further process the modulation symbols (e.g., for OFDM). The TX MIMO processor 220 then provides $N_T$ modulation symbol streams to $N_T$ transceivers ("XCVR") 222A through 222T. In some aspects, the TX MIMO processor 220 applies beam-forming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 222A through 222T are then transmitted from $N_T$ antennas 224A through 224T, respectively.

At the device 250, the transmitted modulated signals are received by NR antennas 252A through 252R and the received signal from each antenna 252 is provided to a respective transceiver ("XCVR") 254A through 254R. Each transceiver 254 conditions (e.g., filters, amplifies, and downconverts) a respective received signal, digitizes the conditioned signal to provide samples, and further processes the samples to provide a corresponding "received" symbol stream.

A receive ("RX") data processor 260 then receives and processes the NR received symbol streams from NR transceivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the device 210.

A processor 270 periodically determines which pre-coding matrix to use (discussed below). The processor 270 formulates a reverse link message comprising a matrix index portion and a rank value portion. A data memory 272 may store program code, data, and other information used by the processor 270 or other components of the device 250.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by the transceivers 254A through 254R, and transmitted back to the device 210.

At the device 210, the modulated signals from the device 250 are received by the antennas 224, conditioned by the transceivers 222, demodulated by a demodulator ("DEMOD") 240, and processed by a RX data processor 242 to extract the reverse link message transmitted by the device 250. The processor 230 then determines which pre-coding matrix to use for determining the beam-forming weights then processes the extracted message. It should be appreciated that for each device 210 and 250 the functionality of two or more of the described components may be provided by a single component In accordance with one aspect of the embodiments described herein, logical channels may be classified into Logical Control Channels and Logical Traffic Channels. The Logical Control Channels may comprise: a BCCH which is a DL channel for broadcasting system control information; a PCCH which is a DL channel that transfers paging information; and/or a MBMS point-to-multipoint Control Channel which is a point-to-multipoint DL channel used for transmitting MBMS scheduling and control information for one or several MTCHs. Generally, after establishing an RRC connection this channel is used by ATs that receive MBMS. In the alternative, or in addition, the Logical Control Channels may comprise DCCH which is a point-to-point bi-directional channel that transmits dedicated control information, and may be used by ATs having an RRC connection. In accordance with another aspect of the embodiments described herein, the Logical Traffic Channels may comprise: a DTCH which is a point-to-point bi-directional channel, dedicated to one AT for the transfer of user information; and/or a MTCH which is a point-to-multipoint DL channel for transmitting traffic data.

In accordance with one aspect, Transport Channels may be classified into DL and UL. The DL Transport Channels may comprise: a BCH, a Downlink Shared Data Channel (DL-SDCH) and a PCH, the PCH for support of UE power saving (DRX cycle is indicated by the network to the UE), broadcasted over entire cell and mapped to PHY resources which can be used for other control/traffic channels. The UL Transport Channels may comprise a RACH, a Request Channel (REQCH), an Uplink Shared Data Channel (UL-SDCH), and/or a plurality of PHY channels. The PHY channels may comprise a set of DL channels and UL channels.

The DL PHY channels may comprise: a Common Pilot Channel (CPICH); Synchronization Channel (SCH); a CCCH; a Shared DL Control Channel (SDCCH); a Multicast Control Channel; a Shared UL Assignment Channel (SUACH); an Acknowledgement Channel (ACKCH); a DL Physical Shared Data Channel (DL-PSDCH); an UL Power Control Channel (UPCCH); a Paging Indicator Channel (PICH); and/or a Load Indicator Channel (LICH).

The UL PHY channels may comprise: a Physical Random Access Channel (PRACH); a Channel Quality Indicator Channel (CQICH); an ACKCH; an Antenna Subset Indicator Channel (ASICH); a Shared Request Channel (SREQCH); an UL Physical Shared Data Channel (UL-PSDCH); and/or a Broadband Pilot Channel (BPICH).

In related aspects, a channel structure is provided that preserves low Peak-to-Average Power Ratio (PAR) (at any given time, the channel is contiguous or uniformly spaced in frequency) properties of a single carrier waveform.

In some aspects, the teachings herein may be employed in a network that includes macro scale coverage (e.g., a large area cellular network such as a 3G networks, typically referred to as a macro cell network) and smaller scale coverage (e.g., a residence-based or building-based network environment). As a UE moves through such a network, the UE may be served in certain locations by access nodes (ANs) that provide macro coverage while the UE may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, evolved Node B (eNodeB), macro cell, and so on. Also, a femto node may be configured or referred to as a Home Node B (HNB), Home evolved Node B (eNodeB), AP base station, femto cell, and so on.

In addition, a new class of small base stations has emerged, which may be installed in a user's home and provide indoor wireless coverage to mobile units using existing broadband Internet connections. Such a base station is generally known as an Access Point (AP) base station, but may also be referred to as Home Node B (HNB) unit, Home evolved Node B unit (HeNB), femto cell, femto Base Station (fBS), base station, or base station transceiver system. Typically, the AP base station is connected to the Internet and the mobile operator's network via a Digital Subscriber Line (DSL), cable internet access, T1/T3, or the like, and offers typical base station functionality, such as Base Transceiver Station (BTS) technology, radio network controller, and gateway support node services. This allows a UE, also referred to as a cellular/mobile device or handset, or access terminal (AT), to connect to the AP base station and utilize the wireless service. ATs can include, for example, cellular phones, smart phones, laptops, handheld communication devices, handheld computing devices, satellite radios, navigational devices, Personal Digital Assistants (PDAs), or any other suitable device for communicating over a wireless communication system.

Figure 3A:
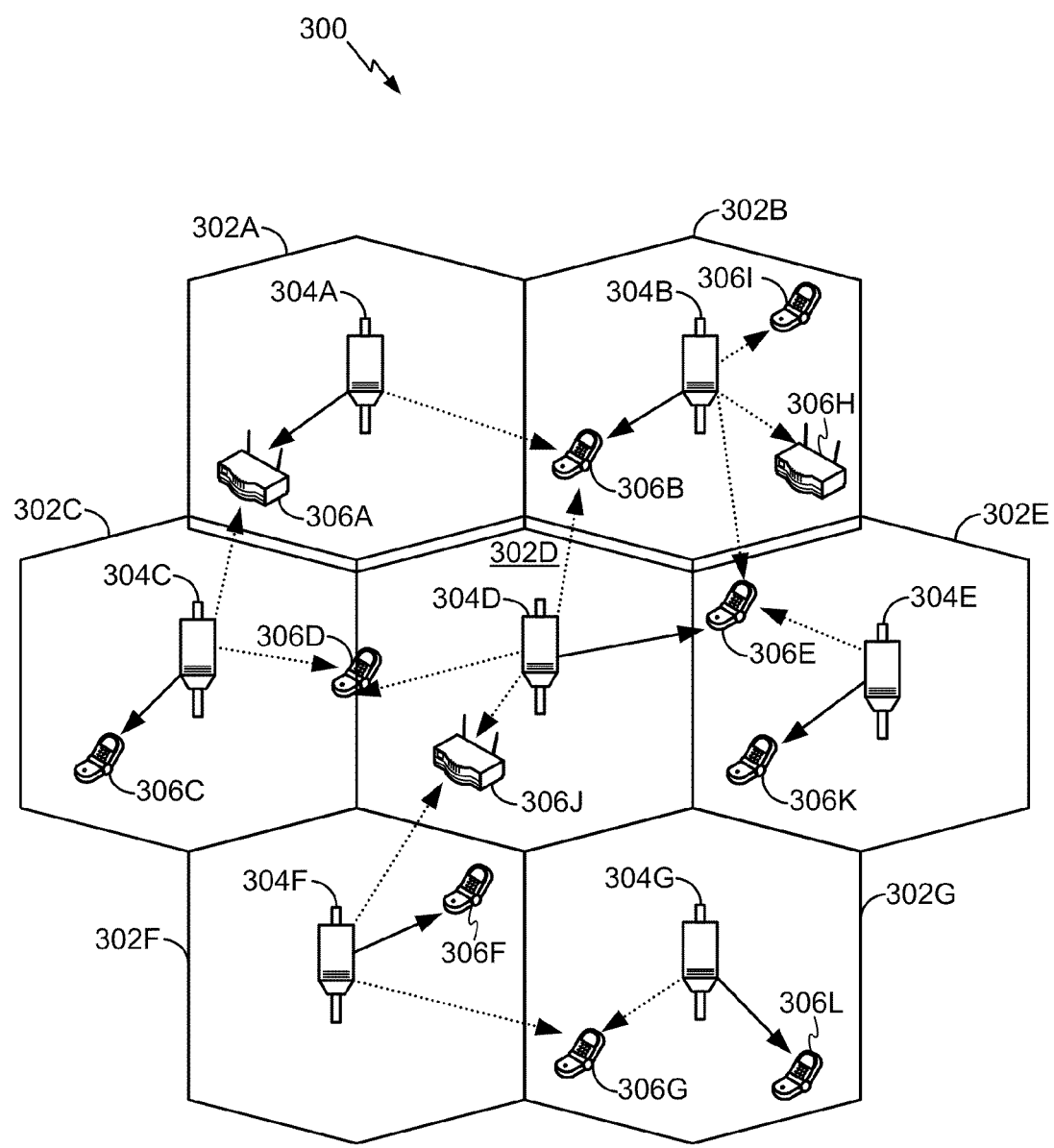
FIGS. 3A-C illustrate aspects of deployment of access point base stations within a network environment.

FIG. 3A illustrates a wireless communication system 300, configured to support a number of users, in which the teachings herein may be implemented. The system 300 provides communication for multiple cells 302, such as, for example, macro cells 302A-302G, with each cell being serviced by a corresponding access node 304 (e.g., access nodes 304A-304G). As shown in FIG. 3, UEs 306 (e.g., UEs 306A-306L) may be dispersed at various locations throughout the system over time. Each UE 306 may communicate with one or more access nodes 304 on a forward link and/or a reverse link at a given moment, depending upon whether the UE 306 is active and whether it is in soft handoff, for example. The wireless communication system 300 may provide service over a large geographic region. For example, macro cells 302A-302G may cover a few blocks in a neighborhood.

Figure 3B:
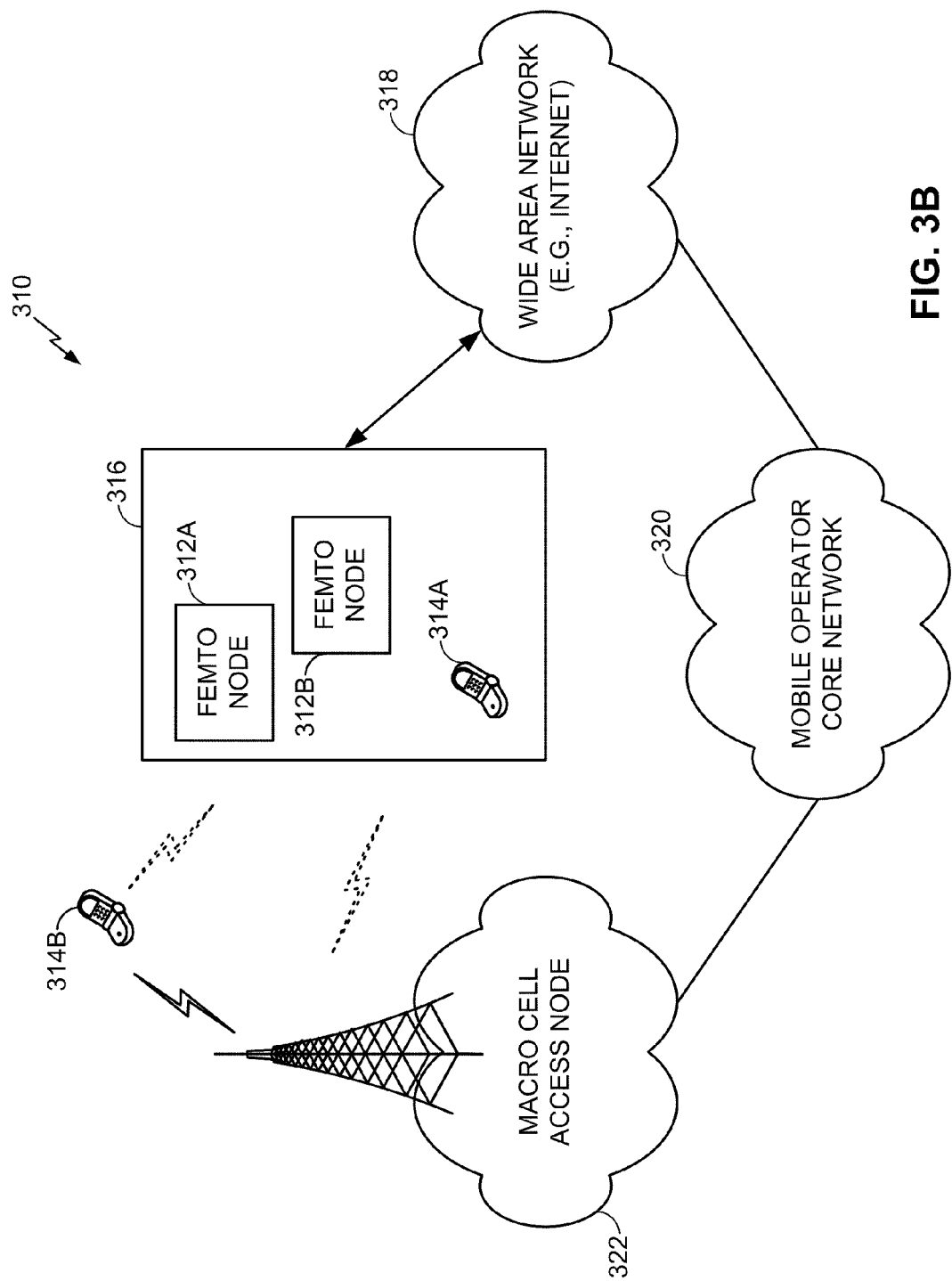

FIG. 3B illustrates an exemplary communication system 310 where one or more femto nodes are deployed within a network environment. Specifically, the system 310 includes multiple femto nodes 312 (e.g., femto nodes 312A and 312B) installed in a relatively small scale network environment (e.g., in one or more user residences 316). Each femto node 312 may be coupled to a wide area network 318 (e.g., the Internet) and a mobile operator core network 320 via a DSL router, a cable modem, a wireless link, or other connectivity means (not shown). As will be discussed below, each femto node 312 may be configured to serve associated UEs 314 (e.g., UE 314A) and, optionally, alien UEs 314 (e.g., UE 314B). In other words, access to femto nodes 312 may be restricted whereby a given UE 314 may be served by a set of designated (e.g., home) femto node(s) 312 but may not be served by any non-designated femto nodes 312 (e.g., a neighbor's femto node 312).

Figure 3C:
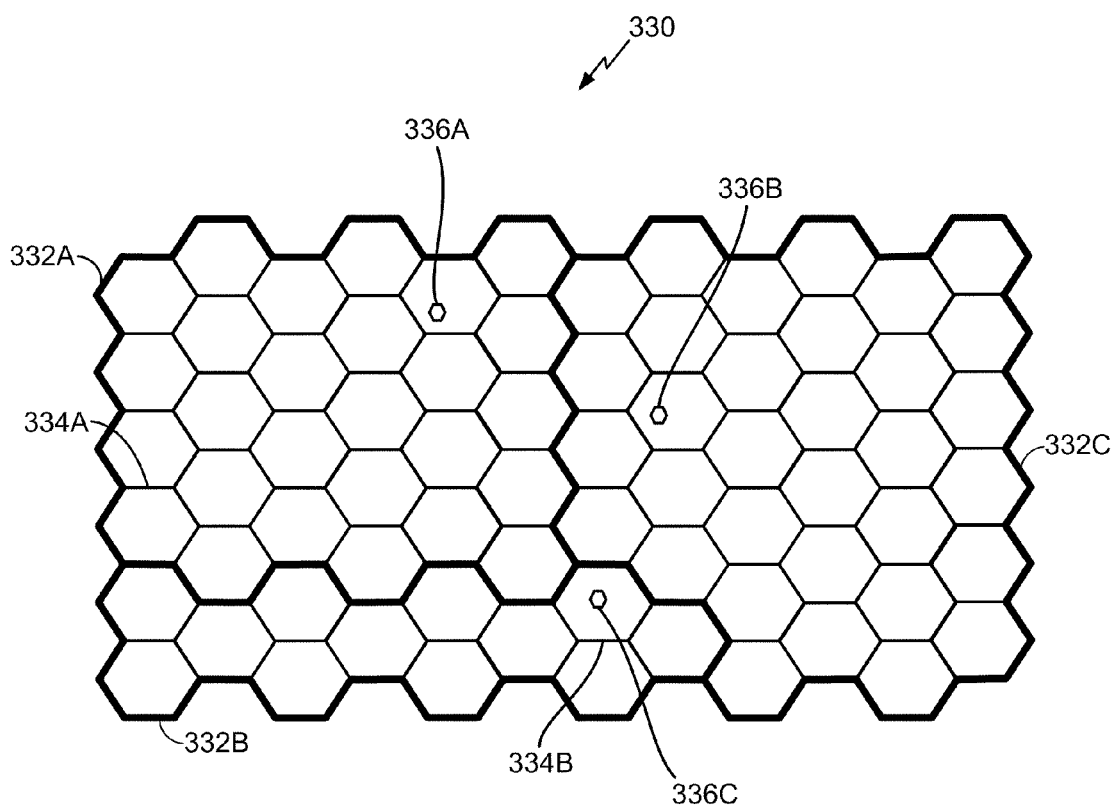

FIG. 3C illustrates an example of a coverage map 330 where several tracking areas 332 (or routing areas or location areas) are defined, each of which includes several macro coverage areas 334. Here, areas of coverage associated with tracking areas 332A, 332B, and 332C are delineated by the wide lines and the macro coverage areas 334 are represented by the hexagons. The tracking areas 332 also include femto coverage areas 336. In this example, each of the femto coverage areas 336 (e.g., femto coverage area 336C) is depicted within a macro coverage area 334 (e.g., macro coverage area 334B). It should be appreciated, however, that a femto coverage area 336 may not lie entirely within a macro coverage area 334. In practice, a large number of femto coverage areas 336 may be defined with a given tracking area 332 or macro coverage area 334. Also, one or more pico coverage areas (not shown) may be defined within a given tracking area 332 or macro coverage area 334.

Referring again to FIG. 3B, the owner of a femto node 312 may subscribe to mobile service, such as, for example, 3G mobile service, offered through the mobile operator core network 320. In addition, an UE 314 may be capable of operating both in macro environments and in smaller scale (e.g., residential) network environments. In other words, depending on the current location of the UE 314, the UE 314 may be served by an access node 322 of the macro cell mobile network 320 or by any one of a set of femto nodes 312 (e.g., the femto nodes 312A and 312B that reside within a corresponding user residence 316). For example, when a subscriber is outside his home, he is served by a standard macro access node (e.g., node 322) and when the subscriber is at home, he is served by a femto node (e.g., node 312A). Here, it should be appreciated that a femto node 314 may be backward compatible with existing UEs 314.

A femto node 312 may be deployed on a single frequency or, in the alternative, on multiple frequencies. Depending on the particular configuration, the single frequency or one or more of the multiple frequencies may overlap with one or more frequencies used by a macro node (e.g., node 322).

In some aspects, an UE 314 may be configured to connect to a preferred femto node (e.g., the home femto node of the UE 314) whenever such connectivity is possible. For example, whenever the UE 314 is within the user's residence 316, it may be desired that the UE 314 communicate only with the home femto node 312.

In some aspects, if the UE 314 operates within the macro cellular network 320 but is not residing on its most preferred network (e.g., as defined in a preferred roaming list), the UE 314 may continue to search for the most preferred network (e.g., the preferred femto node 312) using a Better System Reselection ("BSR"), which may involve a periodic scanning of available systems to determine whether better systems are currently available, and subsequent efforts to associate with such preferred systems. With the acquisition entry, the UE 314 may limit the search for specific band and channel. For example, the search for the most preferred system may be repeated periodically. Upon discovery of a preferred femto node 312, the UE 314 selects the femto node 312 for camping within its coverage area.

A femto node may be restricted in some aspects. For example, a given femto node may only provide certain services to certain UEs. In deployments with so-called restricted (or closed) association, a given UE may only be served by the macro cell mobile network and a defined set of femto nodes (e.g., the femto nodes 312 that reside within the corresponding user residence 316). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of UEs. This set may be temporarily or permanently extended as necessary. In some aspects, a Closed Subscriber Group ("CSG") may be defined as the set of access nodes (e.g., femto nodes) that share a common access control list of UEs. A channel on which all femto nodes (or all restricted femto nodes) in a region operate may be referred to as a femto channel.

Various relationships may thus exist between a given femto node and a given UE. For example, from the perspective of an UE, an open femto node may refer to a femto node with no restricted association. A restricted femto node may refer to a femto node that is restricted in some manner (e.g., restricted for association and/or registration). A home femto node may refer to a femto node on which the UE is authorized to access and operate on. A guest femto node may refer to a femto node on which an UE is temporarily authorized to access or operate on. An alien femto node may refer to a femto node on which the UE is not authorized to access or operate on, except for perhaps emergency situations (e.g., 911 calls).

From a restricted femto node perspective, a home UE may refer to an UE that authorized to access the restricted femto node. A guest UE may refer to an UE with temporary access to the restricted femto node. An alien UE may refer to an UE that does not have permission to access the restricted femto node, except for perhaps emergency situations, for example, such as 911 calls (e.g., a UE that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given UE, and so on.

In accordance with aspects of the particular subject of this disclosure, there are provided methods and apparatuses for multimode system selection across a plurality of wireless system access technologies. In addition, the techniques described herein provide such differentiation with minimal changes to the existing standards and with backward compatibility. In particular, the disclosed methods and apparatus translate network identities across different cellular technologies such as 3GPP and 3GPP2. These translations afford an operator the ability to specify total order regarding the preference of the cellular networks. A mobile device is then able to sort the available cellular networks in correct priority order and select the best system. This invention will assist the multimode device to select the best available wireless technology. Further this invention assists the home carrier to ensure efficient and consistent system selection experience to its subscribers worldwide. This invention enables the carrier to express complex roaming relationships while ensuring backward compatibility by building on the existing 3GPP and 3GPP2 system selection mechanisms.

It is noted, for example, that there are a number of challenges to be addressed before 3GPP2 system selection may work. Some of the identified problems may include an underlying assumption that CDMA2000 networks broadcast PLMN information (i.e. the MCC and MNC). However, the networks of many 3GPP2 operators do not broadcast MCC/MNCs; rather, they broadcast SID/NIDs. Consequently, a UE cannot identify the priority of level of a network it resides in based on the PLMN list alone. Also, cdma2000 1x systems can broadcast a 2-digit MNC but not the full 3-digit MNC. Consequently, there is a possibility of misinterpretation of broadcasted MNCs for CDMA2000 systems. HRPD systems do not broadcast the MCC/MNC, but instead a Subnet-ID.

It is also noted that HRPD (1xEV-DO) systems require an anchor 1x system and operate in Hybrid 1x/DO mode. Consequently, there is a need to associate an HRPD RAT w/a 1x RAT. It is further noted that handling of system selection may come across conflicts between 3GPP and 3GPP2 system selection rules. For example, if the PLMN list indicates DO>1x in terms of priority, but the 3GPP2 system indicates 1x>DO, the system selection techniques should resolve such conflicts. Also, the system selection techniques should break or prevent system selection loops between PRL and PLMN. Further, the system selection techniques preferably perform background scans between 3GPP and 3GPP2 systems.

It is further noted that system selection techniques preferably provide or address features that 3GPP system selection rules do not typically offer, such as, for example, how to maintain efficient acquisition (scans or system discovery) for 3GPP2 systems, especially for background scans. The 3GPP standard does not allow operators to provision bandclass or channel information. Also, 3GPP2 system selection supports location-based prioritization of systems (e.g., using geographical region indicators (GEOs)), whereas 3GPP does not. 3GPP mandates a single global prioritization of systems via the PLMN List.

In addition, the number of MCC/MNCs allocated to a single operator may be significantly smaller than the number of SID/NIDs allocated to a single operator. The former may be only a few per MCC and the latter may range from the tens to hundreds. This basically implies the geo-spatial granularity of location-spaced system priority lists would become coarse if MCC/MNCs were used for CDMA2000 systems.

Figure 4:
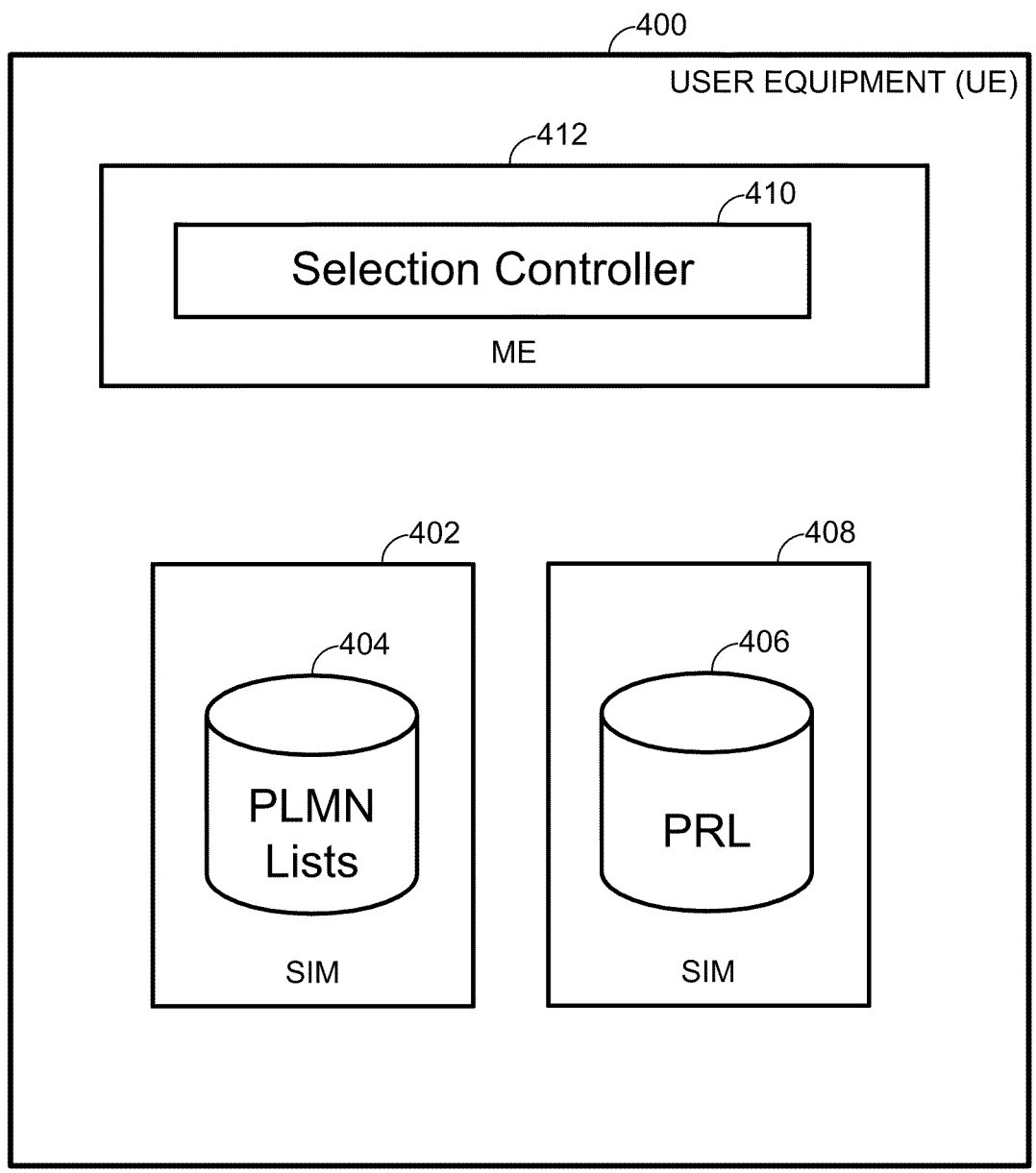
FIG. 4 illustrates a block diagram of an exemplary multi-mode user equipment (UE) or other mobile device.

FIG. 4 illustrates a block diagram of an exemplary multi-mode user equipment (UE) or other mobile device. The device 400 includes a SIM or Universal SIM (USIM) 402 containing a database 404 storing the list of PLMNs used for selection of a system or network within 3GPP technologies, in particular. It is noted that the PLMN lists may be predetermined and provided in the SIM 402 prior to distribution of the UE 400, and may also be updated OTA using SIM toolkit and SMS. Similarly, the device 400, being a multimode device, may also include a database 406 storing a PRL for use in selecting between various 3GPP2 technologies. A default PRL may provided in the UE 400 prior to distribution, programmed at the point of sales using service programming tools, or updated OTA using OTASP, as examples. The PRL database 406 may be located in a SIM 408 or RUIM (Removable Subscriber Identity Module) or may alternatively be integral to the hardware or mobile equipment (ME) of the UE 400.

UE 400 may also include a selection controller (SC) 410 that controls the selection of the particular network/service and access technology. According to an aspect, SC 410 may be part of the hardware or mobile equipment (ME) 412, whether that be as a separate controller or as software or firmware executable by a processor, such as a Digital Signal Processor (DSP) or microprocessor in the UE 400. The operation of SC 410 and how it affects system selection will be described in further detail to follow.

In order to manage the selection across multiple technologies (e.g., 3GPP and 3GPP2), the present disclosure includes methods and apparatus that utilize existing mechanisms to manage PRL and PLMN lists for system selection. According to an aspect, one or more of the search databases may be extended with further information that cross-references or translates to the other databases. In this way, one search database may be utilized during selection of the best technology and system/network within the technology for efficient system selection by consulting one database instead of multiple databases.

Figure 5:
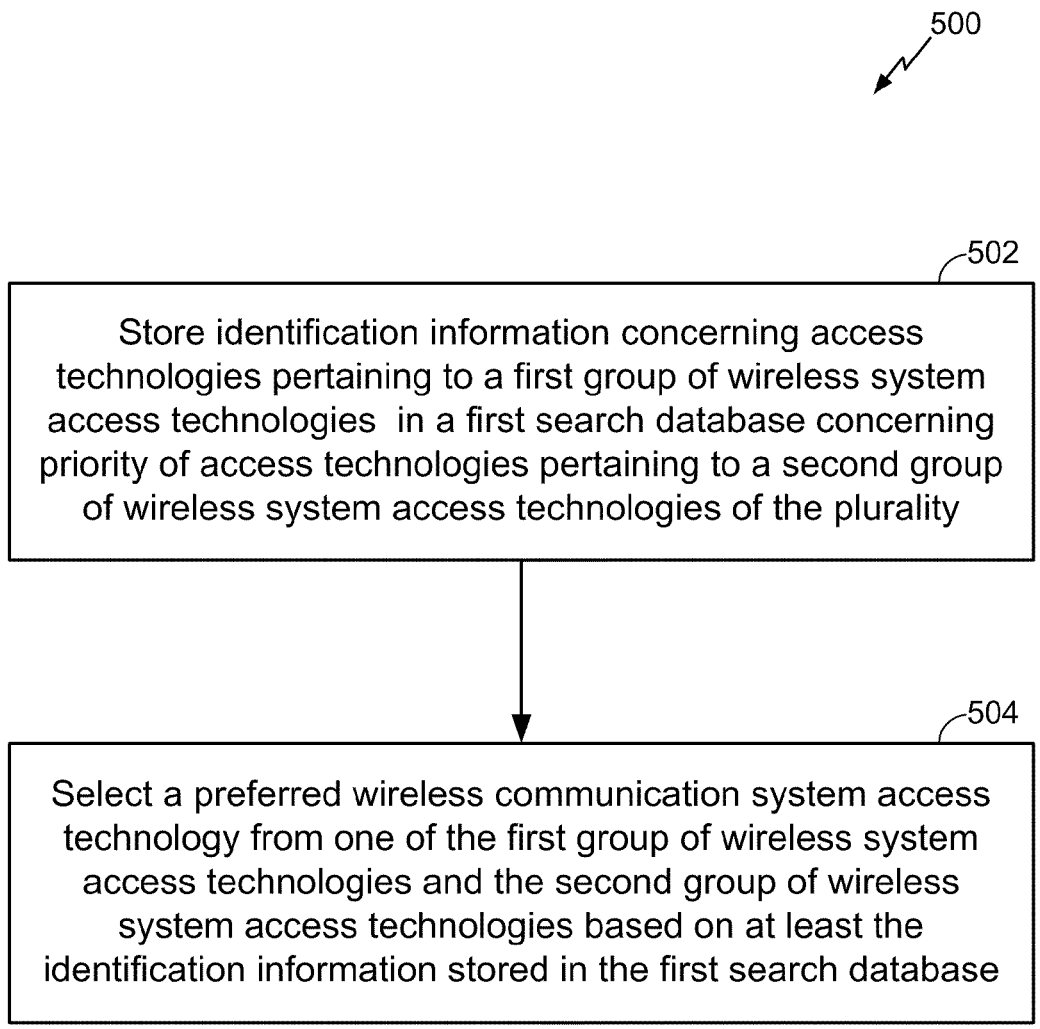
FIG. 5 illustrates a flow diagram of an exemplary method for use in system selection with the device of FIG. 4.

As an example, FIG. 5 illustrates an exemplary method 500 for system selection within a user device having two or more search databases (e.g., PRL and PLMN lists). In particular, method 500 effects the selection of a wireless communication system access technology from a plurality of wireless system access technologies supported by a wireless device, such as device 400 in FIG. 4. Method 500 includes a first block 502 where identification information concerning access technologies pertaining to a first group of wireless system access technologies, (e.g., a 3GPP2 group of technologies), is stored in a first search database pertaining to another second group of technologies (e.g., a list of PLMNs for 3GPP technologies). As an example, the identification information may be comprised of an extension bit or bits pertaining to or identifying each network or system within the first group of 3GPP2 access technologies. Thus, in this example, the first search database would be a list of PLMNs and concern the priority of access technologies pertaining to a second group of wireless system access technologies (i.e., 3GPP technologies). It is noted that this is merely one implementation and that instead of extending a list of PLMNs with identification information about 3GPP2 technologies, as an alternative, a PRL list could be extended with identification information about 3GPP technologies, as an example. Thus, the first and second groups, for purposes of FIG. 5, could be respective ones of 3GPP, 3GPP2, or any other suitable technology groups, and the first and second databases may correspond to search database structures pertinent to whatever technology group the database pertains (e.g., PLMN for 3GPP, PRL for 3GPP2, etc.).

Figure 6:
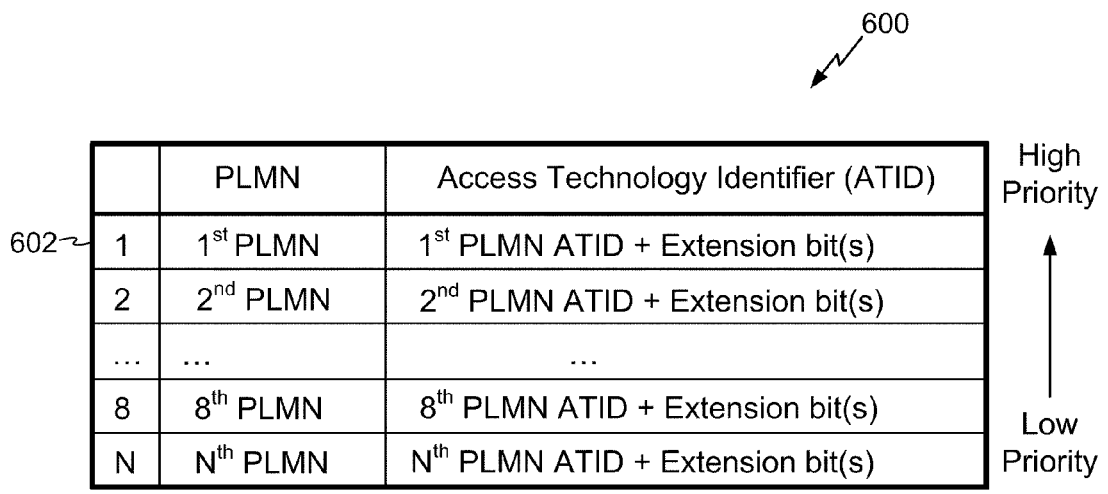
FIG. 6 illustrates at least a portion of an exemplary PLMN list structure that may be stored in a search database, such as database 404 in FIG. 4.

According to a particular example, the extension bit or bits may be added to Access Technology Identifiers (ATIDs) associated with PLMNs in the list of PLMNs stored in a search database. As an example, FIG. 6 illustrates at least a portion of an exemplary PLMN list structure 600 that may be stored in a search database, such as database 404 in FIG. 4. The list structure 600 includes a priority numbering or ordering where the list is from highest to lowest priority from entries 1 through some number N. Each entry in the list 600 (e.g., first entry 602) entry corresponds to a PLMN that may be selected for 3GPP technologies (e.g., the "first group of wireless system access technologies" as described above.). In one example, a single bit may extend or add to one or more of the ATIDs in list 600 in order to indicate support of another access technology group, such as 3GPP2 or WiMax, as examples. Furthermore, a single bit may be used to indicate support of the wireless access technology group (e.g., 3GPP2). As an alternative, multiple bits may be added to an ATID in the list 600 in order to provide further information about particular wireless access systems or networks within the wireless access technology group. For example, if 3GPP2 is supported, the additional bits may indicate technologies such as cdma2000 or EV DO are supported, as merely examples in the instance of a 3GPP2 group of technologies.

Turning back to FIG. 5, after establishing the extension to the first search database in block 502, flow proceeds to block 504. At this block a preferred wireless communication system access technology from one of the first group of wireless system access technologies and the second group of wireless system access technologies is then selected based on the identification information stored in the search database. In other words, the first database becomes a primary search database. For example, given the list of FIG. 6, a selection controller (e.g., SC 410 in FIG. 4) may use the PLMN list 600 to determine either a 3GPP technology from entries extant in the PLMN list or a 3GPP2 technology based on the extension bit(s) added to the ATID information. It is noted that a selection controller or similar functional module may use the extension information in the PLMN list to then determine whether to search for a 3GPP2 network or system based on the extension of the ATID in an aspect. The 3GPP2 systems may then be searched by referring to the PRL. Furthermore, it is contemplated in this scenario that if a conflict arises between the best 3GPP system found and the best 3GPP2 system found, that this conflict may be resolved based on a predetermined priority either to the PLMN list or the PRL.

According to another aspect, it is contemplated that with the structure of the PLMN list 600 in FIG. 6, that the PRL could be eliminated if additional bits are used with the extension to the PLMN ATIDs. Accordingly, a selection controller could determine which is the best 3GPP2 system to search for when the device is roaming and would be configured to know which 3GPP2 system is preferable.

In yet another aspect, it is contemplated that in the example of extending the search database storing the PLMN list such that both 3GPP and 3GPP2 systems (or other technologies such as WiMax) may be identified by MCC/MNC tuples for identification. Accordingly, an operator of a 3GPP2 system would utilize MCC/MNC for system identification. It is further contemplated in connection with this usage that 3GPP2 networks could be adapted to broadcast MCC and MNC information fields in an Extended System Parameter Message (ESPM), and further that the PRL would include MCC/MNC in system records within the search database in a user equipment (UE). In an example, the PRL could issue MCC/MNC of the best 3GPP2 system found in a geographical region to a selection controller in a UE. In turn, the selection controller would then consult the primary search database such as PLMN database for the PLMN list to resolve priorities among 3GPP and 3GPP2 (or WiMax) systems.

As mentioned above, it is contemplated that 3GPP2 networks, for example, could be adapted to broadcast MCC and MNC information fields in an Extended System Parameter Message (ESPM) or equivalent, as wells as the PRLs including MCC/MNC in system records within the search database in a user equipment (UE). However, if not all operators of 3GPP2 networks broadcast MCC/MNC information, or the PRL is incomplete in this regard, situations could arise where selection of the best available or preferred technology (e.g., choosing between 3GPP or 3GPP2 technologies) may not be able to be completed.

Figure 7:
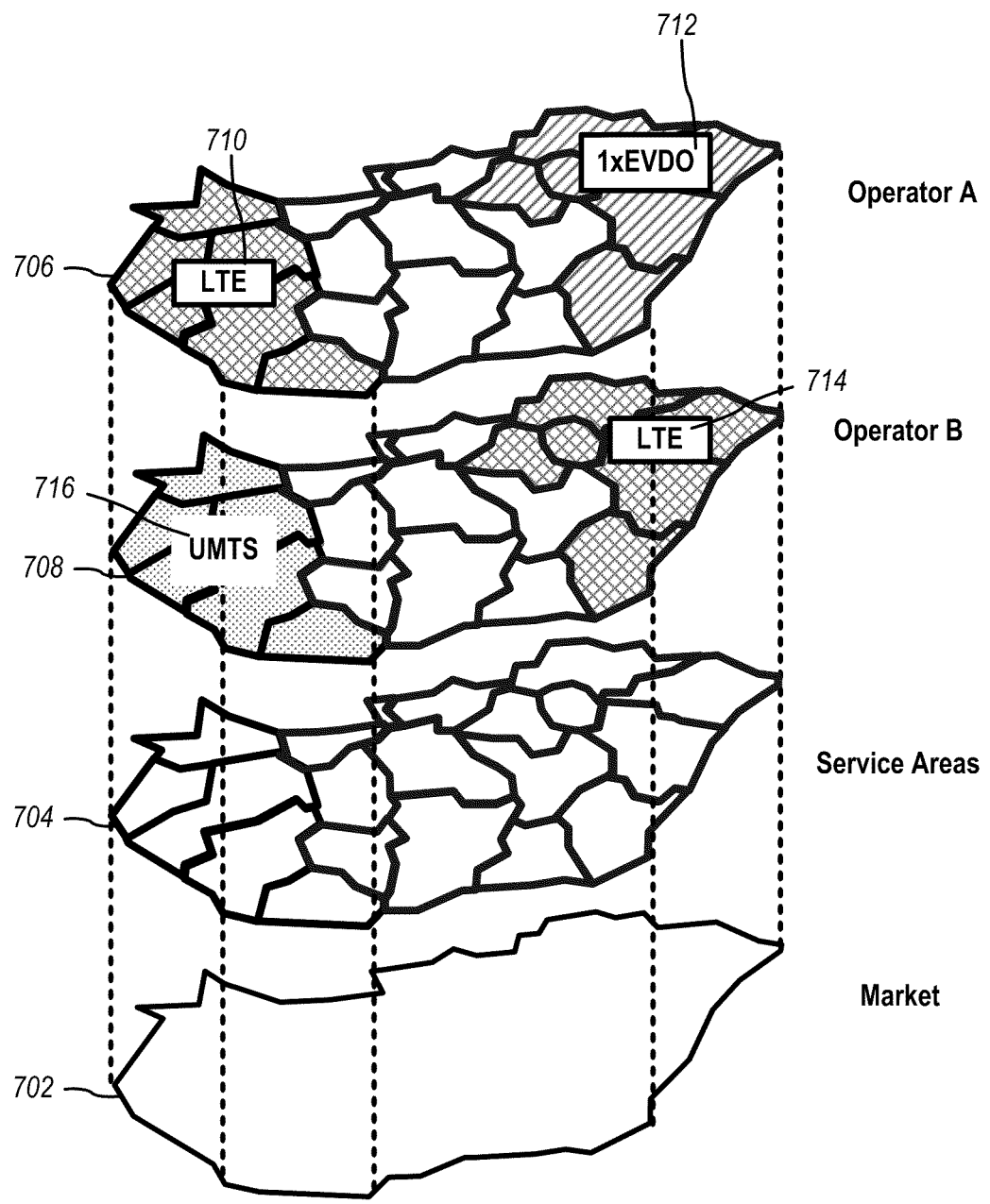
FIG. 7 illustrates an example of various levels of service areas and operators' services over a singular geographical area or market

For purposes of illustration, FIG. 7 shows various levels of service areas and operators' services over a singular geographical area or market. Within a market 700 and various service areas 702 in the market 700, an Operator A might offer LTE in the West (710) and 1xEVDO in the east (712) as illustrated by level 706. Another operator, Operator B, might offer LTE (714) in the East and UMTS (716) in the West as illustrated by layer 708. Assuming LTE is preferred to 1xEVDO in terms of PLMN priority in a UE subscribing to Operator A, when the UE subscriber travels to the East, Operator B's LTE network will be selected rather than Operator A's EV DO network if the MCC/MNC information is missing. In such case, however, the access technology preference (i.e., Operator A's EV DO network of a different access technology group 3GPP2) is not selected.

In order to remedy the situation above, in another aspect, a UE, and more particularly a selection controller may be further configured to arbitrate among the databases (e.g., PRL and PLMN lists) to select among the preferred system or network from multiple wireless access technologies (e.g., 3GPP and 3GPP2). In particular, the disclosed apparatus and methods effect mapping of identifiers associated with system access technologies for a first group of wireless system access technologies (e.g., SID/NID for 3GPP2 access technologies) to second identifiers associated with the second group of wireless system access technologies (e.g., MCC/MNC for 3GPP technologies).

Figure 8:
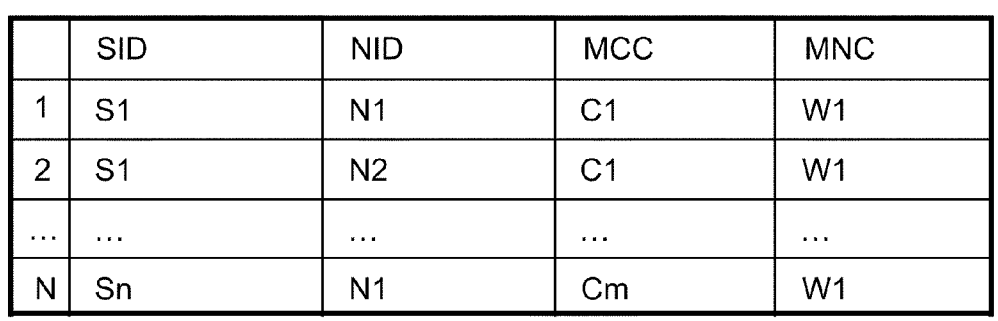
FIG. 8 illustrates at least a portion of an exemplary mapping table to map or translate SID/NID identifiers to MCC/MNC identifiers.

As an example of such mapping, FIG. 8 illustrates a mapping table 800 that correlates or maps SID/NID combinations to an MCC/MNC pair. As illustrated, each of the numbered row entries (e.g., row entries 1 through N) in table 800 correspond to a respective network or systems having an associated SID and/or NID (e.g., S1, N2). Each row then correlates the SID/NID to an associated MCC/MNC values (e.g., C1, W1). It is noted that this table 800 may be stored within the UE in the PRL database or corresponding SIM, the PLMN lists database or corresponding SIM, or another memory or database in communication with the selection controller. It is further noted that table 800 may be constructed by a particular carrier and either included with the UE or programmed or updated via OTA communication (e.g., OTASP) from either a 3GPP operator or 3GPP2 operator.

Figure 9:
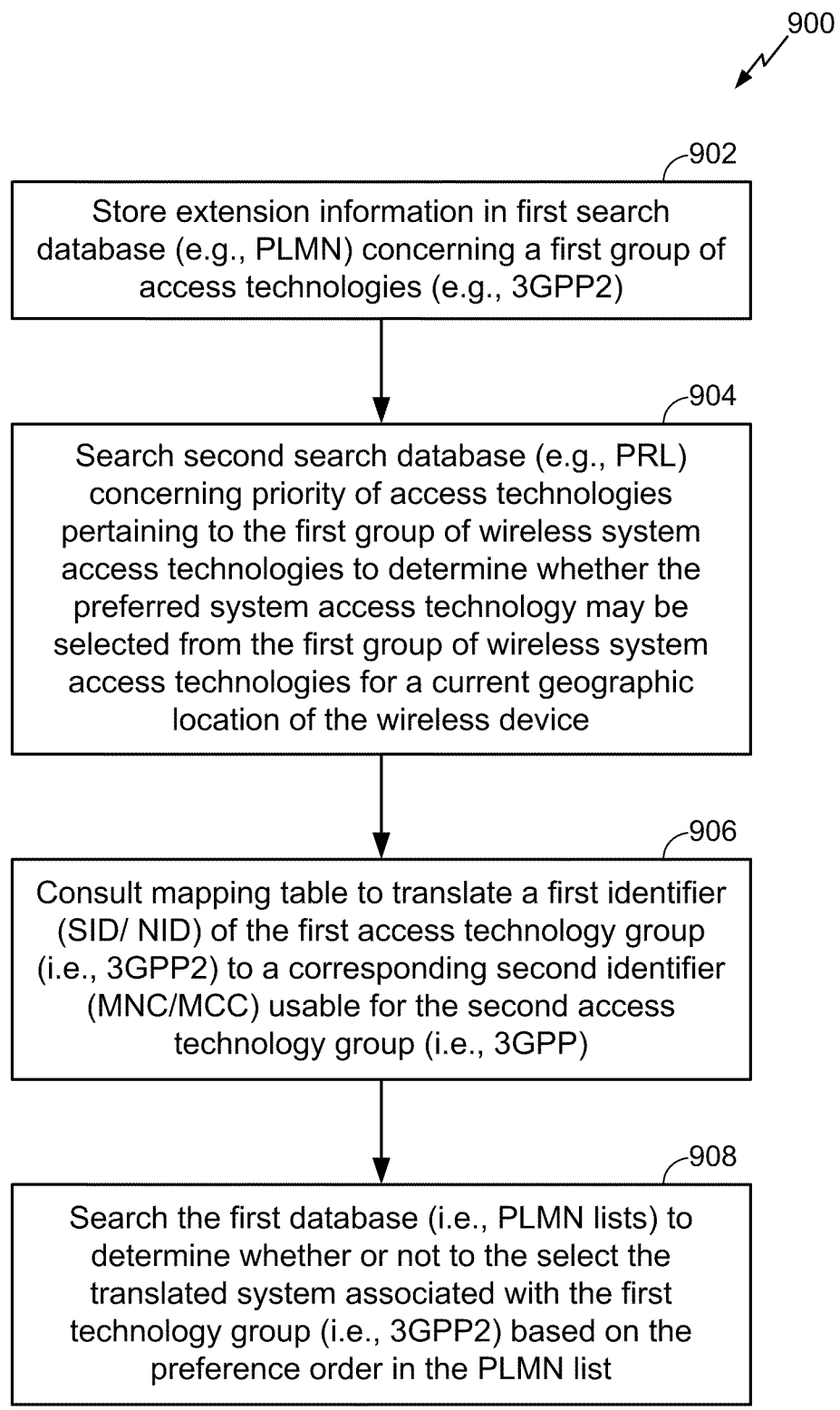
FIG. 9 illustrates a flow diagram of another exemplary method for use in system selection with the device of FIG. 4.

Assuming an example where ATIDs of the PLMN lists have been extended to support 3GPP2, the PLMN list will therefore include 3GPP2 operators that may use MCC/MNC. FIG. 9 illustrates an exemplary method 900 that may be effected by a selection controller (e.g., SC 110 in FIG. 4) to determine selection of a wireless access technology. In this particular example, it is assumed that a first database pertaining to a second group of technologies (i.e., 3GPP) have been extended (i.e., PLMN list ATIDs are extended), similar to methods disclosed previously herein. Accordingly, method 900 includes storing extension information in first search database (i.e., PLMN) concerning a first group of access technologies (i.e., 3GPP2) as illustrated by block 902.

After the operation of block 902, flow proceeds to block 904 where a second search database (i.e., the PRL) concerning at least priority of access technologies pertaining to the first group of wireless system access technologies (i.e., 3GPP2) is searched or consulted in order to determine whether the best or preferred system access technology within the first group (i.e., 3GPP2) supported in the particular geographic location over which the UE is currently located is to be selected. The processes of block 604 may be implemented by a selection controller (e.g. SC 110) or other similar device or functional module. It is noted that the database of these first group technologies (i.e., the PRL for 3GPP2) may either have identification based on MCC/MNC or SID/NID.

It is noted that if the MCC/MNC is known either from the PRL or the PLMN databases, selection may be made of the determined preferred access technology based on the operations in block 904. In the case where the MCC/MNC is not available from the PRL or PLMN databases, the method 900 is then configured to consult the mapping table 800 to translate the SID/NID of the first access technology group (i.e., 3GPP2) to a corresponding MNC/MCC pair usable for the second access technology group (i.e., 3GPP) as illustrated by block 906. The selection controller may then search the PLMN lists to determine whether to select the translated 3GPP2 based on the preference order in the PLMN lists as shown in block 908, which is similar to block 504 illustrated in FIG. 5. It is noted that the processes of blocks 606 and 608 may be effected by SC 410 or similar device or functional module.

Referring back to the example in the illustration of FIG. 7, and in light of the methodology of FIG. 9, when a UE subscriber of Operator A travels to the Eastern service areas, a PRL in the UE may be consulted to determine which network or system is preferred as shown by the exemplary PRL 1002 in FIG. 10. In the given example, a selection controller would consult the Acquisition table 1004 and System Table 1006 to determine the base 3GPP2 system at the particular geographical location, which is the "East" in this particular example (thus the particular System Table 1006 would be pertinent to this geographical location only). Since an Acquisition index of 1 would be of higher preference in this particular example, a cellular CDMA technology (i.e., a 3GPP2 technology) is to be selected over other network types when the roaming indicator is on.

If the MCC/MNC is not known in the PLMN list, which is extended to include 3GPP2 information, the selection controller then consults SID/NID to MCC/MNC mapping table 1008 to translate the SID/NID S1 and N1 to the MCC/MNC of 310/2. Based on this information, when the selection controller refers to the PLMN list 1010 for selection of the preferred network or system, it may be seen that the MCC/MNC 310/2 for the East area corresponding to a 3GPP2 technology (e.g., 1xEVDO 714 as may be seen in FIG. 7) has preference over the LTE 716 of Operator B in the same geographic "East" locale. Accordingly, the preferred 3GPP2 access technology will be selected, thus correcting the scenario presented above in the discussion of the example of FIG. 7.

It is noted that in the case of further conflicts between the PRL and the PLMN, as an example, additional rules such as a PRL override of PLMN priority may be utilized for 3GPP2 systems. Also, it is contemplated that an additional triage database (not shown) may be constructed to base an order for service on both MCC/MNC and SID/NID pairs when 3GPP2 roaming partners do not have a correlative MCC/MNC.

Figure 11A:
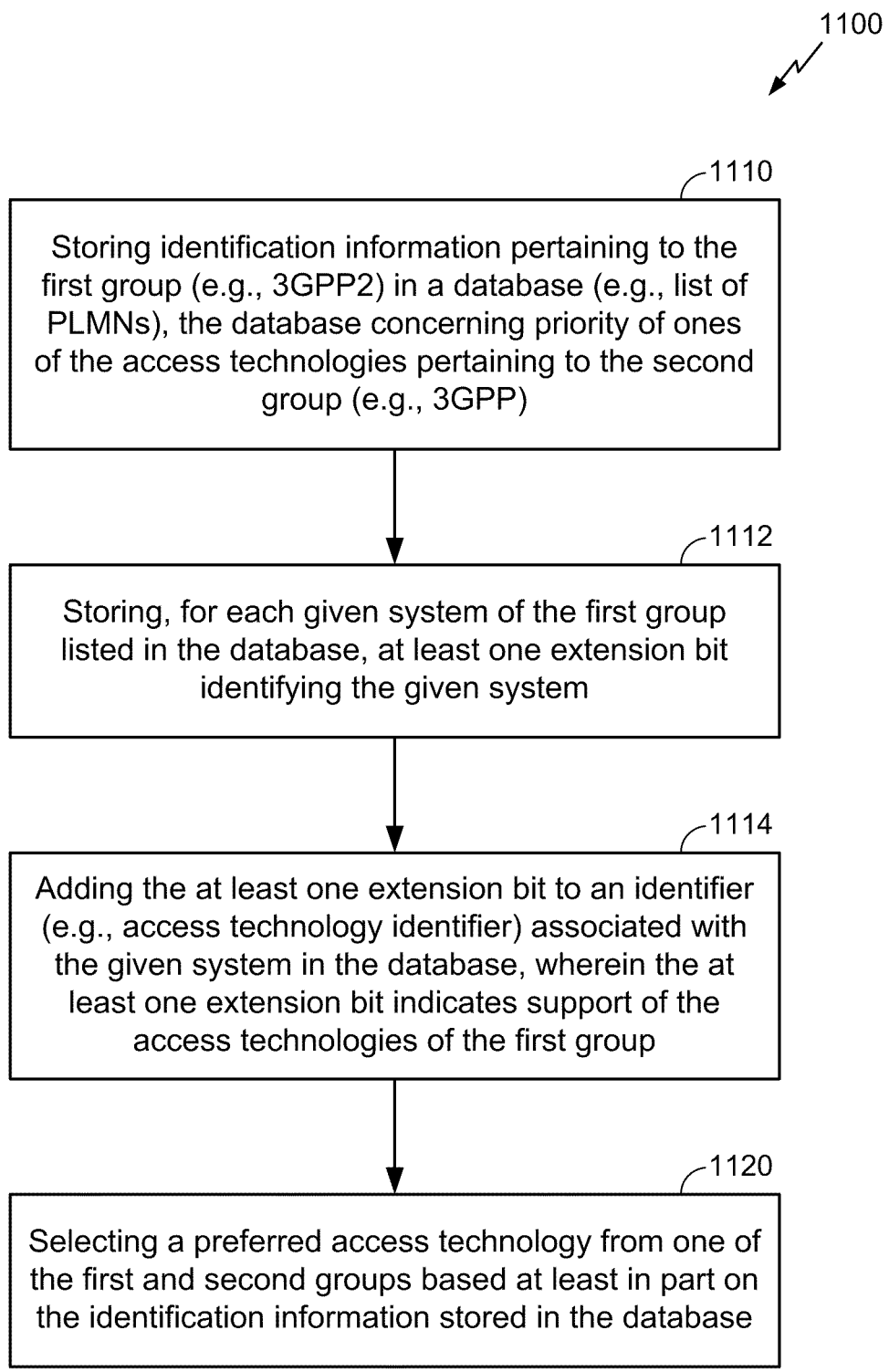
FIG. 11A shows one embodiment of a method for system selection from a plurality of wireless system access technologies.

In accordance with one or more aspects of the embodiments described herein, there are provided methods for system selection from a plurality of wireless system access technologies. With reference to the flow diagram shown in FIG. 11A, there is provided a method 1100 that may be performed at an UE or components thereof. The method 1100 may involve selecting a system/network from the plurality of wireless system access technologies, wherein the plurality may comprise a first group and a second group. The method 1100 may involve, at step 1110, storing identification information pertaining to the first group in a database, the database concerning priority of ones of the access technologies pertaining to the second group. The method 1100 may involve, at step 1120, selecting a preferred access technology from one of the first and second groups based at least in part on the identification information stored in the database.

In one embodiment, step 1110 may involve storing, for each given system of the first group listed in the database, at least one extension bit identifying the given system (step 1112). Step 1110 may involve adding the at least one extension bit to an identifier associated with the given system in the database (step 1114). In related aspects, the identifier may comprise an access technology identifier (ATID). In further related aspects, the database may comprise a list structure for prioritizing access technologies from at least one of the first group and the second group.

Figure 11B:
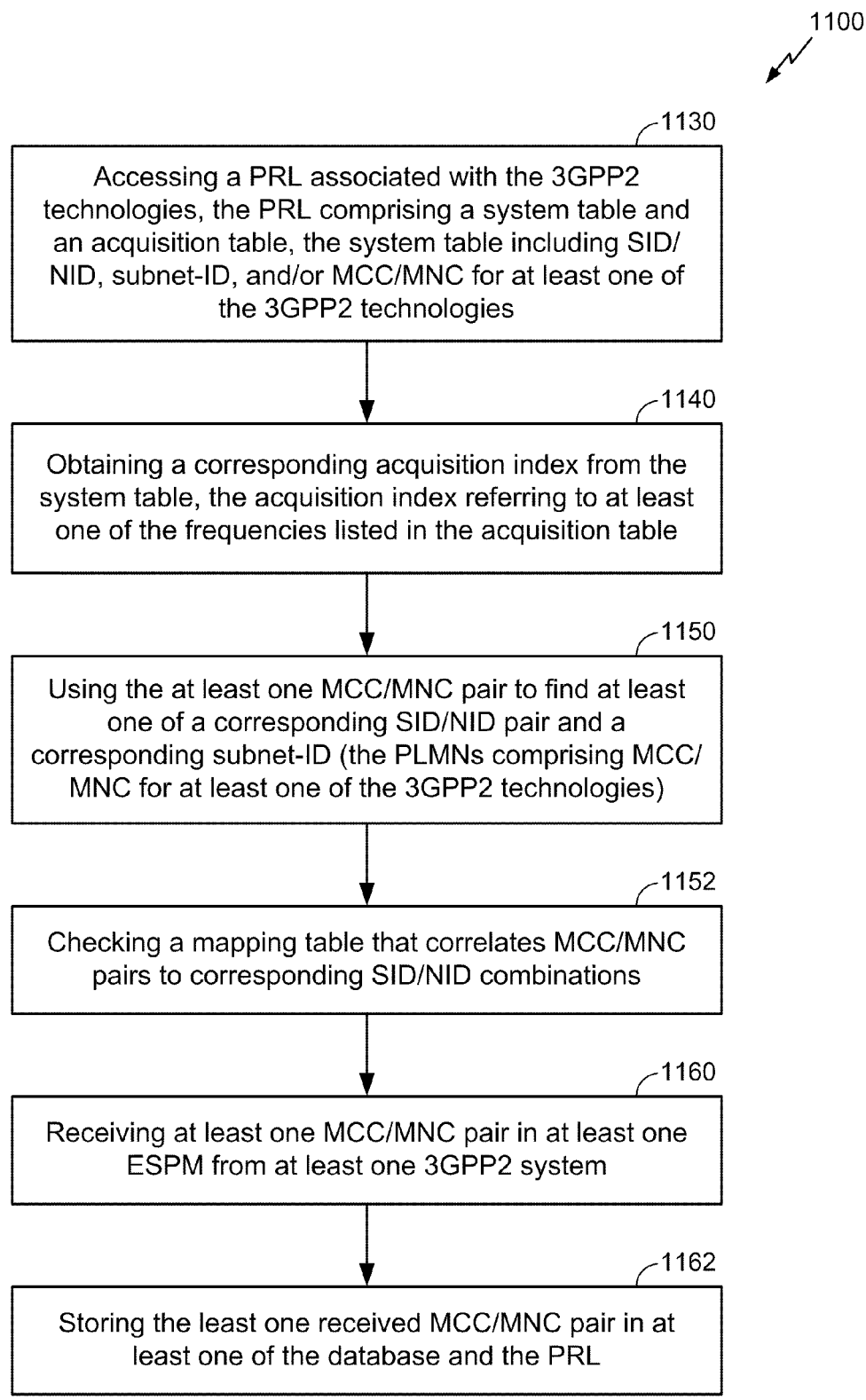
FIGS. 11B-C show sample aspects of the method shown in FIG. 11A.

For example, the at least one extension bit may indicate support of the access technologies of the first group. The first group may comprise 3GPP2 technologies. The second group may comprise 3GPP technologies. The database may comprise a list of Public Land Mobile Networks (PLMNs) associated with the 3GPP technologies. The at least one extension bit may extend at least one entry of the list of the PLMNs. With reference to FIG. 11B, the method 1100 may involve accessing a Preferred Roaming List (PRL) associated with the 3GPP2 technologies, the PRL comprising a system table and an acquisition table (step 1130).

The system table of the PRL may include at least one system identifier (SID)/network identifier (NID) combination for at least one of the 3GPP2 technologies. In the alternative, or in addition, the system table of the PRL may include at least one subnet-ID for at least one of the 3GPP2 technologies. The system table of the PRL may be adapted to comprise at least one Mobile Country Code (MCC)/Mobile Network Code (MNC) pair for at least one of the 3GPP2 technologies. In related aspects, the method 1100 may involve, for a given MCC/MNC pair in the system table, obtaining a corresponding acquisition index from the system table, the acquisition index referring to at least one of the frequencies listed in the acquisition table (step 1140).

The list of the PLMNs may include at least one MCC/MNC pair for at least one of the 3GPP2 technologies. The method 1100 may involve, at step 1150, using the at least one MCC/MNC pair to find at least one of a corresponding SID/NID pair and a corresponding subnet-ID. Step 1150 may comprise checking a mapping table that correlates MCC/MNC pairs to corresponding SID/NID combinations (step 1152).

The method 1100 may involve, at step 1160, receiving at least one MCC/MNC pair in at least one Extended System Parameter Message (ESPM) from at least one 3GPP2 system. The method may further involve, at step 1162, storing the at least one received MCC/MNC pair in at least one of the database and the PRL.

Figure 11C:
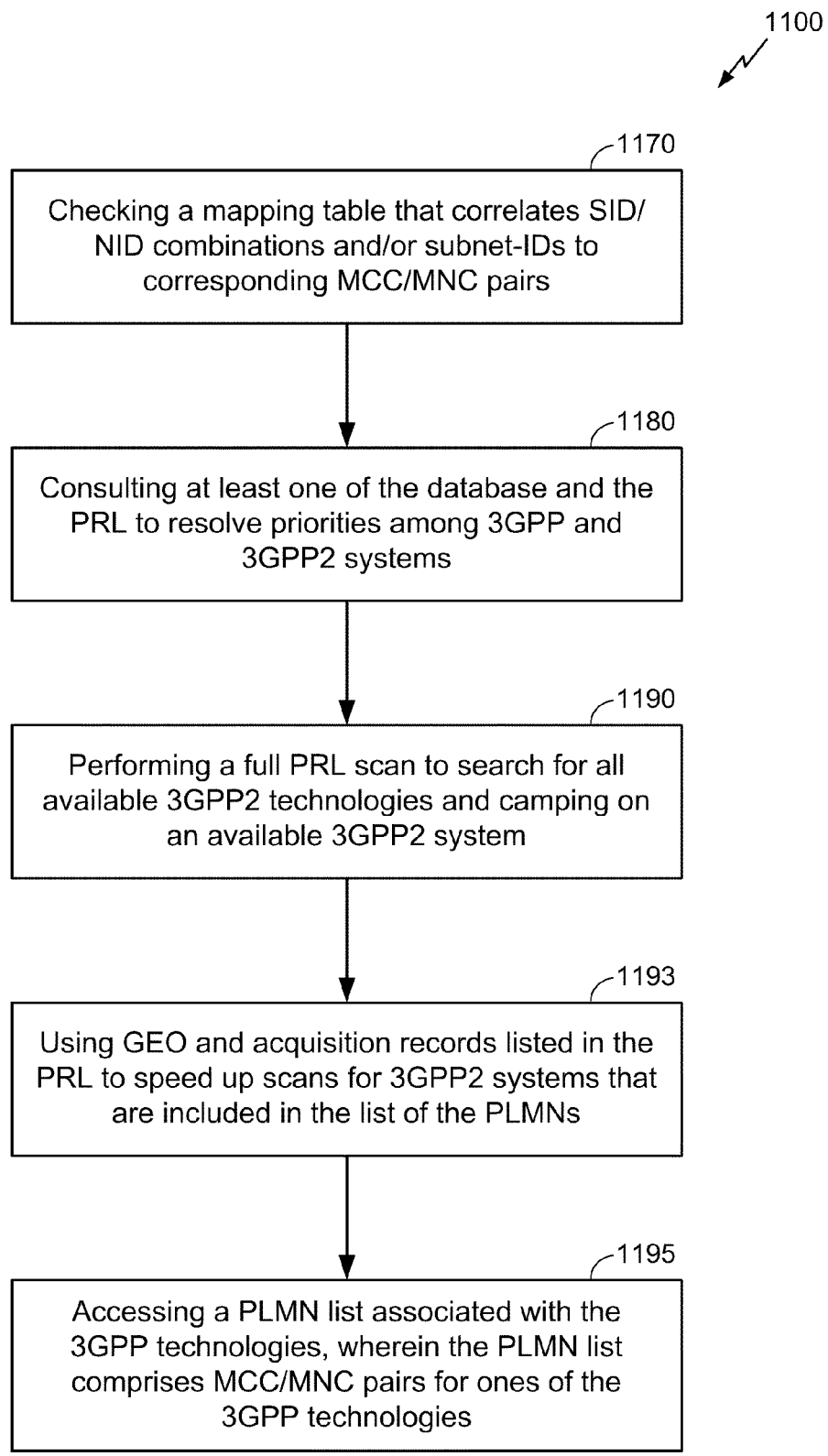

With reference to FIG. 11C, the method 1100 may involve, at step 1170, using a SID/NID combination and/or a subnet-ID in the PRL to find a corresponding MCC/MNC pair, such as, for example, by checking a mapping table that correlates SID/NID combinations and/or subnet-IDs to corresponding MCC/MNC pairs. The method 1100 may involve, at step 1180, consulting at least one of the database and the PRL to resolve priorities among 3GPP and 3GPP2 systems.

In related aspects, there is provided an embodiment wherein: the selected preferred access technology corresponds to at least one 3GPP2 system; the at least one 3GPP2 system is not associated with MCC/MNC pairs; and the list of PLMNs includes at least one block entry corresponding to the 3GPP2 technologies. The method 1100 may involve, at step 1190, in response to encountering the at least one block entry, (a) performing a full PRL scan to search for all available 3GPP2 technologies and (b) camping on an available 3GPP2 system.

Alternatively, the method may involve using GEO and acquisition records listed in the PRL to speed up scans for 3GPP2 systems that are included in the list of the PLMNs (step 1193).

In further related aspects, the database may comprise a system priority list that is geo-spatial for a particular region. The system priority list comprises a list of PLMNs. The database may comprise a system table and an acquisition table.

In another embodiment, the identification information may pertain to Worldwide Interoperability for Microwave Access (WiMax) technologies in the first group, and may be used to extend at least one entry of a list of PLMNs for 3GPP technologies in the second group. In another embodiment, the second group may comprise 3GPP2 technologies. The database may comprise a PRL associated with the 3GPP2 technologies. The identification information may pertain to 3GPP technologies and may be used to extend at least one entry of the PRL. The method 1100 may involve, at step 1195, accessing a PLMN list associated with the 3GPP technologies, wherein the PLMN list comprises MCC/MNC pairs for ones of the 3GPP technologies, as shown in FIG. 11C.

Figure 12:
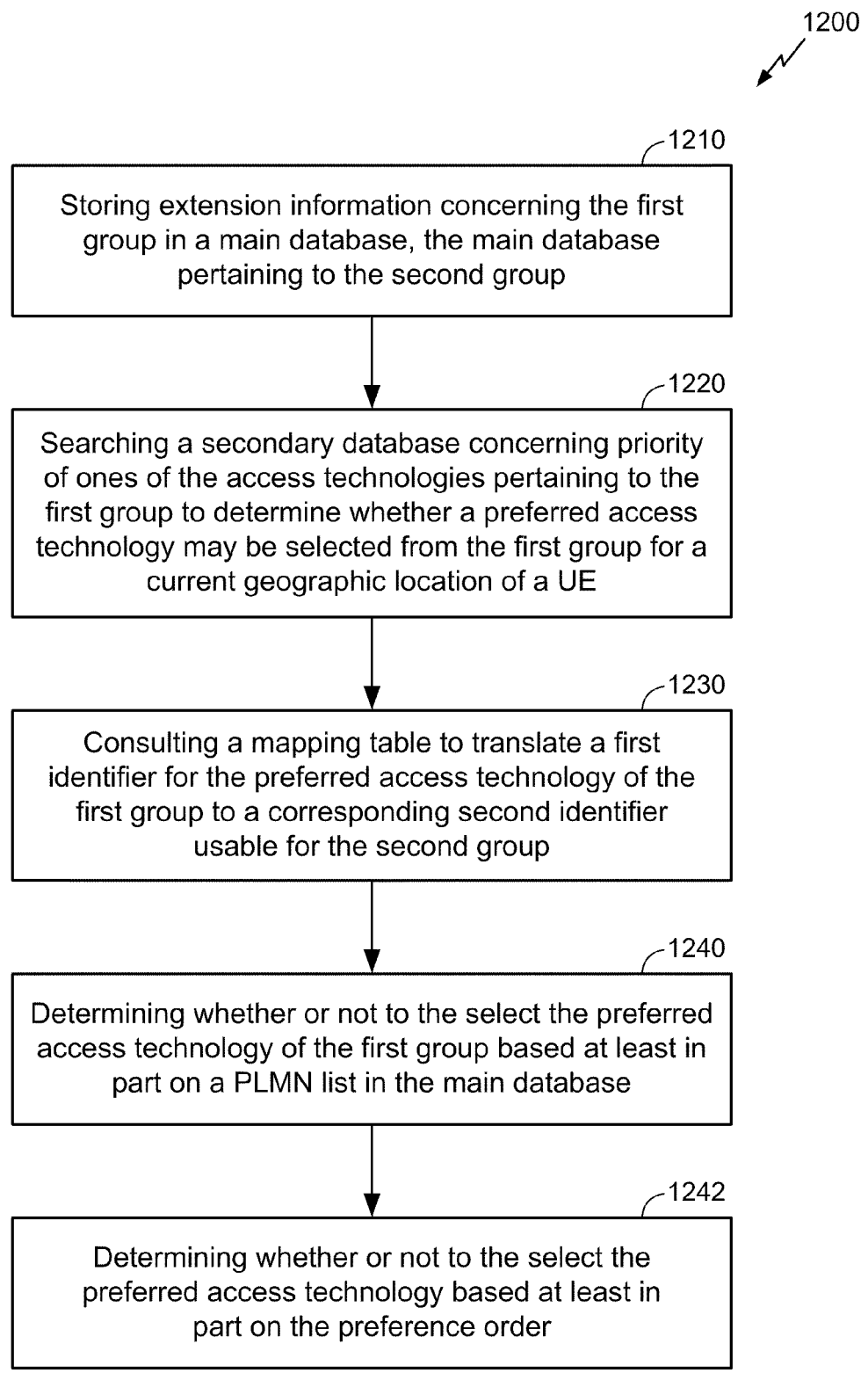
FIG. 12 shows another embodiment of a method for system selection.

In accordance with one or more aspects of the embodiments described herein, there is provided another method for system selection from a plurality of wireless system access technologies. With reference to the flow diagram shown in FIG. 12, there is provided a method 1200 that may be performed at an UE or components thereof. The method 1200 may involve selecting a system/network from the plurality of wireless system access technologies, wherein the plurality may comprise a first group and a second group. The method 1200 may involve, at step 1210, storing extension information concerning the first group in a main database, the main database pertaining to the second group. The method 1200 may involve, at step 1220, searching a secondary database concerning priority of ones of the access technologies pertaining to the first group to determine whether a preferred access technology may be selected from the first group for a current geographic location of a UE.

For example, the extension information may comprise, for each given access technology of the first group listed in the main database, at least one extension bit identifying the given access technology. In one embodiment, the first group may comprise 3GPP2 technologies, and the second group may comprise 3GPP technologies. The main database may comprise a PLMN list, and the secondary database may comprise a PRL.

In related aspects, the method 1200 may involve, at step 1230, consulting a mapping table to translate a first identifier for the preferred access technology of the first group to a corresponding second identifier usable for the second group. For example, the first identifier may comprise a SID/NID combination, and the second identifier may comprise an MNC/MCC pair. The method 1200 may involve, at step 1240, determining whether or not to select the preferred access technology of the first group based at least in part on a PLMN list in the main database. The PLMN list may comprise a preference order, and step 1240 may comprise determining whether or not to select the preferred access technology based at least in part on the preference order (step 1242).

Figure 13A:
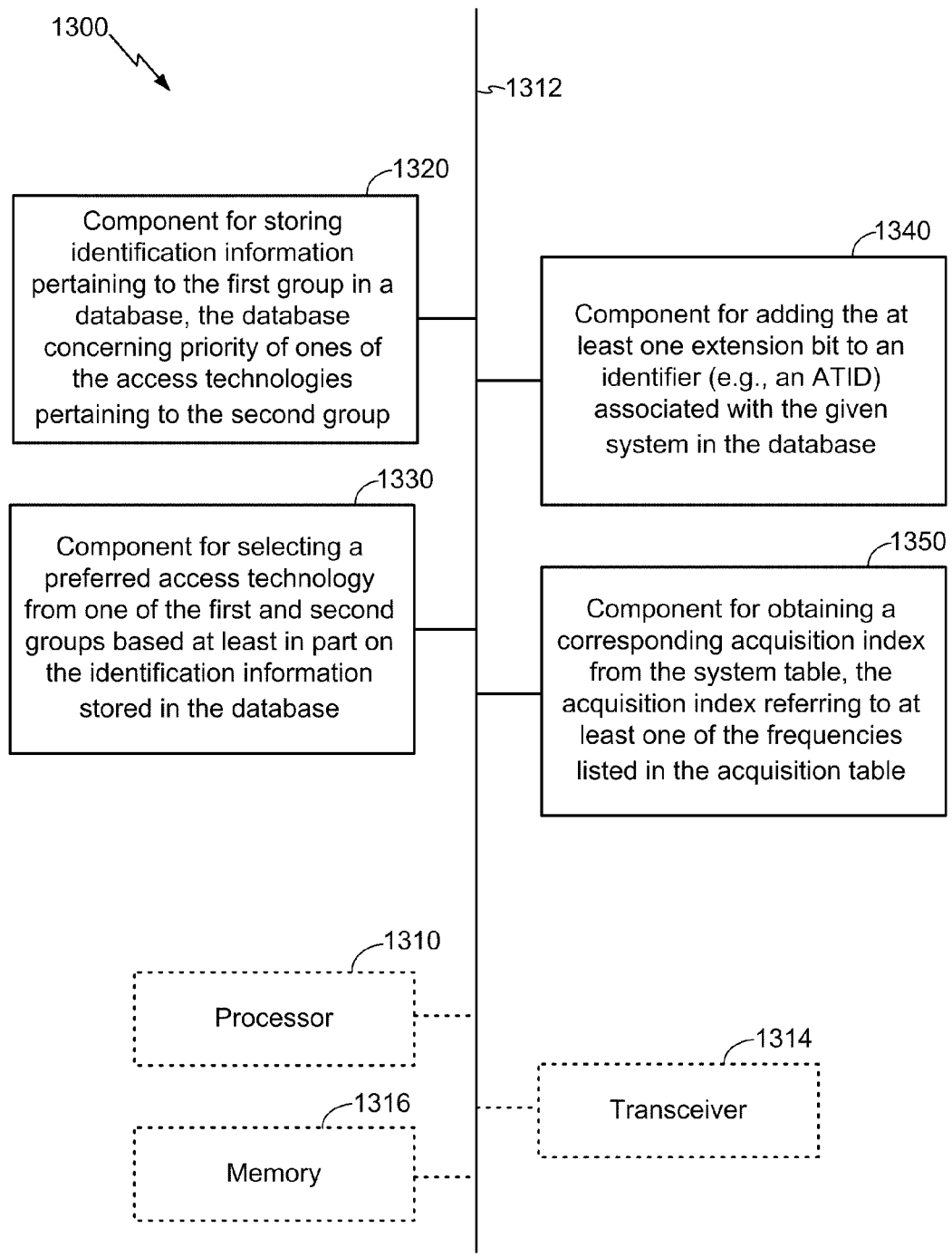
FIGS. 13A-C illustrate one embodiment of an apparatus for system selection from a plurality of wireless system access technologies.

In accordance with one or more aspects of the embodiments described herein, there are provided devices and apparatuses for system selection from a plurality of wireless system access technologies, the plurality comprising a first group and a second group. With reference to FIG. 13A, there is provided an exemplary apparatus 1300 that may be configured as either a UE or as a processor or similar device for use within the UE or similar communication device. As depicted, apparatus 1300 may include functional blocks that can represent functions implemented by a processor, software, or combination thereof (e.g., firmware).

As illustrated, apparatus 1300 may comprise an electrical component 1320 for storing identification information pertaining to the first group in a database, the database concerning priority of ones of the access technologies pertaining to the second group. For example, apparatus 1300 may comprise an electrical component 1330 for selecting a preferred access technology from one of the first and second groups based at least in part on the identification information stored in the database. In related aspects, the identification information may comprise, for each given system of the first group listed in the database, at least one extension bit identifying the given system. Apparatus 1300 may comprise an electrical component 1340 for adding the at least one extension bit to an identifier (e.g., an ATID) associated with the given system in the database. The database may comprise a list structure for prioritizing access technologies from at least one of the first group and the second group.

In one embodiment, the at least one extension bit may indicate support of the access technologies of the first group. The first group may comprise 3GPP2 technologies, and the second group may comprise 3GPP technologies. The database may comprise a list of PLMNs associated with the 3GPP technologies. The at least one extension bit may extend at least one entry of the list of the PLMNs. The at least one processor may access a PRL associated with the 3GPP2 technologies, the PRL comprising a system table and an acquisition table.

In related aspects, the system table of the PRL may comprise at least one SID/NID combination for at least one of the 3GPP2 technologies. In the alternative, or in addition, the system table may comprise at least one subnet-ID for at least one of the 3GPP2 technologies. In further related aspects, the system table of the PRL may be adapted to comprise at least one MCC/MNC pair for at least one of the 3GPP2 technologies. Apparatus 1300 may comprise an electrical component 1350, for a given MCC/MNC pair in the system table, obtaining a corresponding acquisition index from the system table, the acquisition index referring to at least one of the frequencies listed in the acquisition table.

Figure 13B:
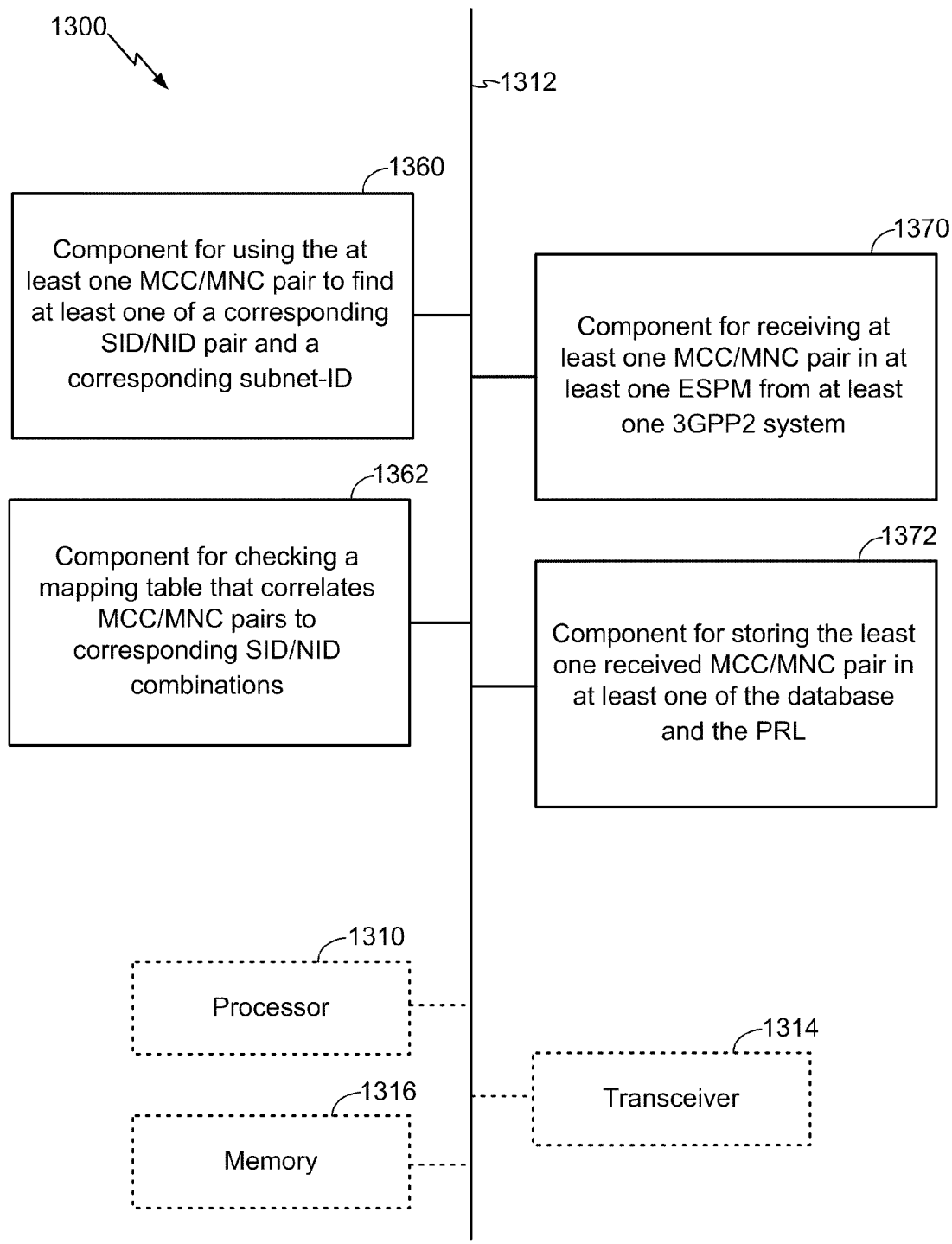

In another embodiment, the list of the PLMNs may comprise at least one MCC/MNC pair for at least one of the 3GPP2 technologies. With reference to FIG. 13B, apparatus 1300 may comprise an electrical component 1360 for using the at least one MCC/MNC pair to find at least one of a corresponding SID/NID pair and a corresponding subnet-ID. Apparatus 1300 may further comprise an electrical component 1362 for checking a mapping table that correlates MCC/MNC pairs to corresponding SID/NID combinations.

In related aspects, apparatus 1300 may comprise an electrical component 1370 for receiving at least one MCC/MNC pair in at least one ESPM from at least one 3GPP2 system. Apparatus 1300 may further comprise an electrical component 1372 for storing the at least one received MCC/MNC pair in at least one of the database and the PRL.

Figure 13C:
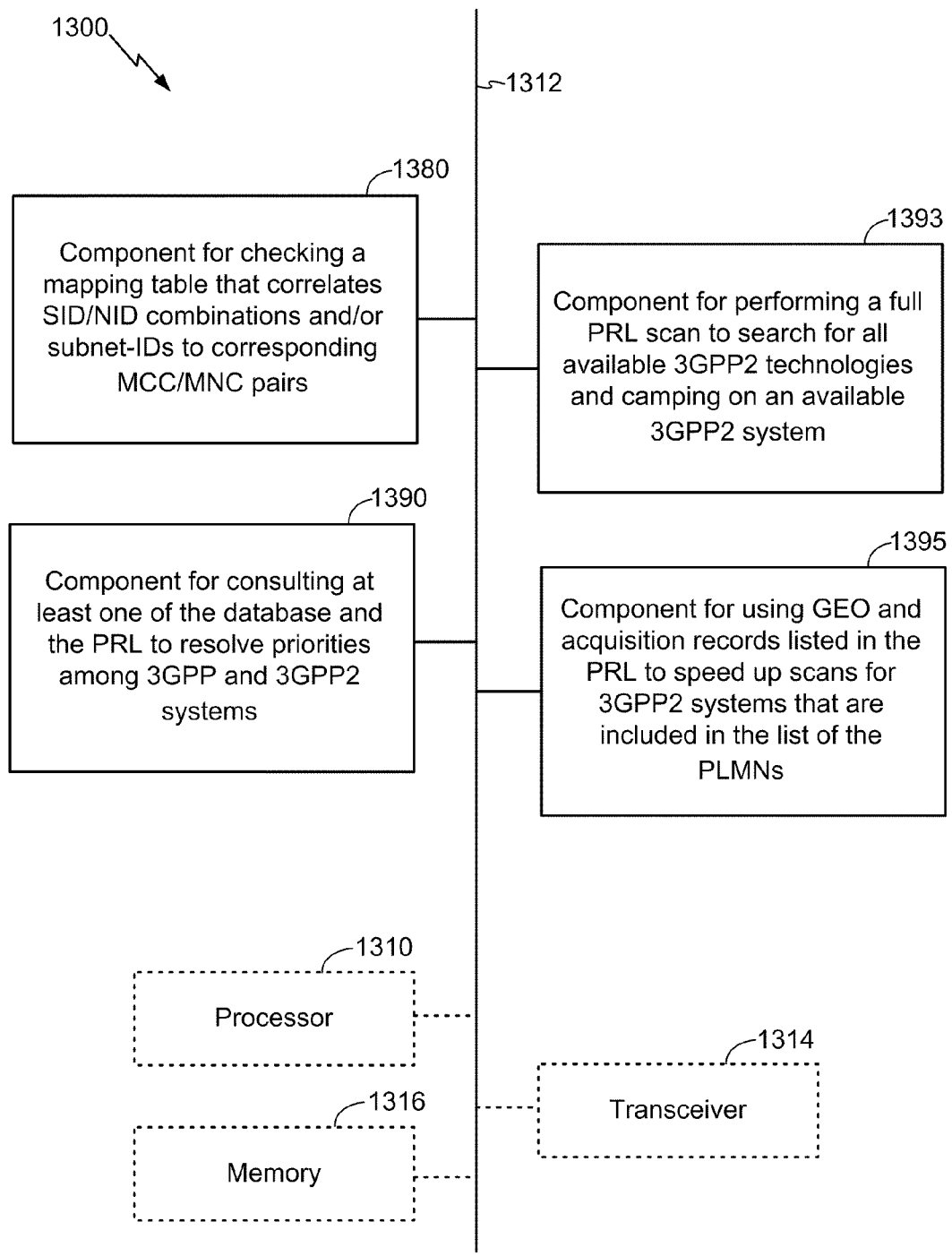

With reference to FIG. 13C, in further related aspects, apparatus 1300 may comprise an electrical component 1380 for using a SID/NID combination and/or subnet-ID in the PRL to find a corresponding MCC/MNC pair, such as, for example, by checking a mapping table that correlates SID/NID combinations and/or subnet-IDs to corresponding MCC/MNC pairs. It is noted that apparatus 1300 may comprise an electrical component 1390 for consulting at least one of the database and the PRL to resolve priorities among 3GPP and 3GPP2 systems.

In yet another embodiment, the selected preferred access technology corresponds to at least one 3GPP2 system, the at least one 3GPP2 system is not associated with MCC/MNC pairs, and the list of PLMNs includes at least one block entry corresponding to the 3GPP2 technologies. Apparatus 1300 may further comprise an electrical component 1393 for, in response to encountering the at least one block entry, (a) performing a full PRL scan to search for all available 3GPP2 technologies and (b) camping on an available 3GPP2 system, as shown in FIG. 13C.

Alternatively, apparatus 1300 may comprise an electrical component 1395 using GEO and acquisition records listed in the PRL to speed up scans for 3GPP2 systems that are included in the list of the PLMNs.

In still another embodiment, the database may comprise a system priority list that is geo-spatial for a particular region. The system priority list may comprise a list of PLMNs. The database may comprise a system table and an acquisition table.

It is noted that apparatus 1300 may optionally include a processor module 1310 having at least one processor, in the case of apparatus 1300 configured as a communication device, rather than as a processor. Processor 1310, in such case, may be in operative communication with components 1320-1395 via a bus 1312 or similar communication coupling. Processor 1310 may effect initiation and scheduling of the processes or functions performed by components 1320-1395.

In related aspects, apparatus 1300 may include a transceiver module 1314. A stand alone receiver and/or stand alone transmitter may be used in lieu of or in conjunction with transceiver 1314. In further related aspects, apparatus 1300 may optionally include an electrical component for storing information, such as, for example, a memory device/module 1316. Computer readable medium or memory device/module 1316 may be operatively coupled to the other components of apparatus 1300 via bus 1312 or the like. The computer readable medium or memory device 1316 may be adapted to store computer readable instructions and data for effecting the processes and behavior of components 1320-1395, and subcomponents thereof, or processor 1310, or the methods disclosed herein. Memory module 1316 may retain instructions for executing functions associated with electrical components 1320-1395. While shown as being external to memory 1316, it is to be understood that electrical components 1320-1395 can exist within memory 1316.

Figure 14:
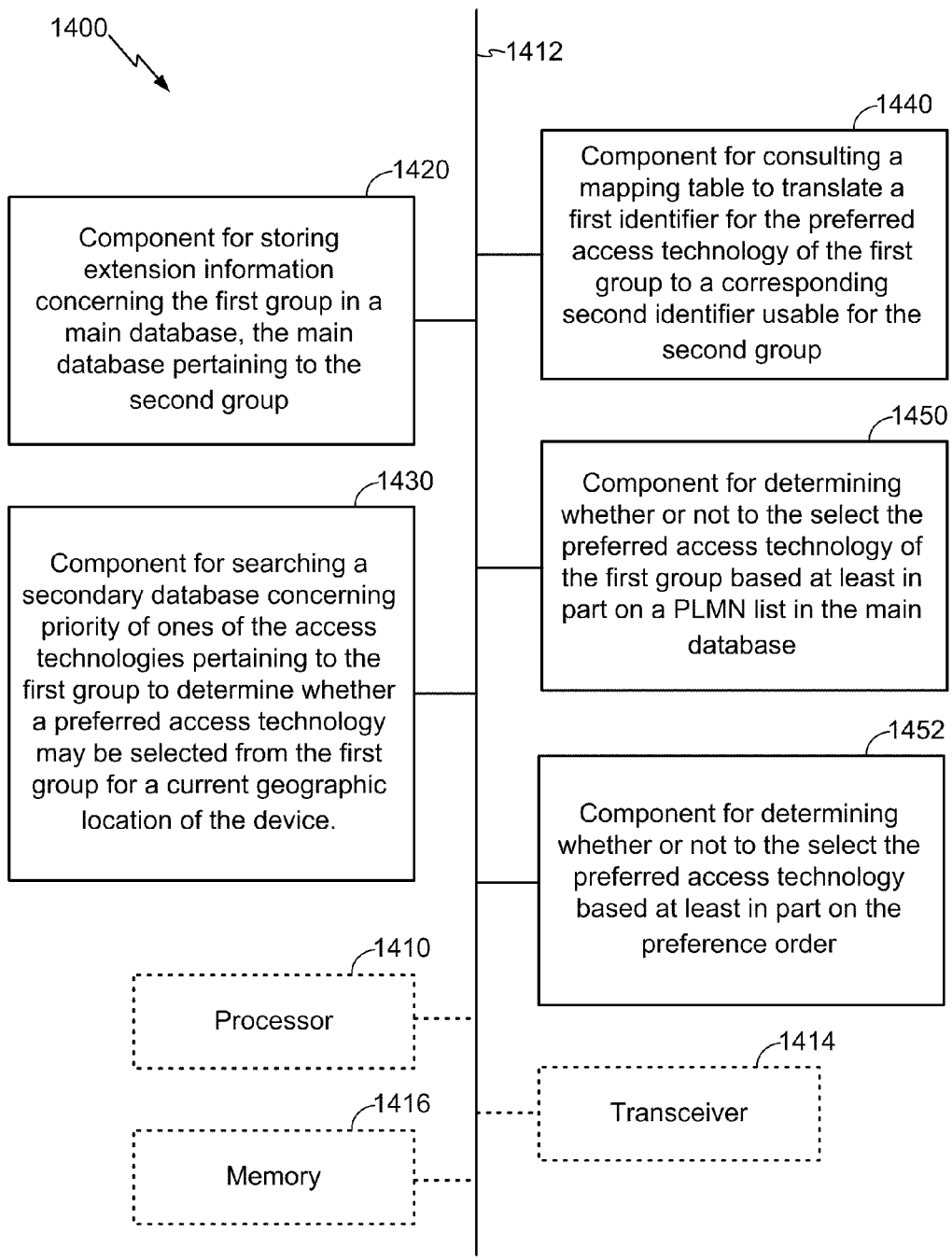
FIG. 14 illustrates another embodiment of an apparatus for system selection.

In accordance with one or more aspects of the embodiments described herein, there is provided another apparatus for system selection from a plurality of wireless system access technologies. With reference to FIG. 14, there is provided an exemplary apparatus 1400 that may be configured as either a UE or as a processor or similar device for use within the UE or similar communication device. As depicted, apparatus 1400 may include functional blocks that can represent functions implemented by a processor, software, or combination thereof (e.g., firmware).

As illustrated, apparatus 1400 may comprise an electrical component 1420 for storing extension information concerning the first group in a main database, the main database pertaining to the second group. Apparatus 1400 may comprise an electrical component 1430 for searching a secondary database concerning priority of ones of the access technologies pertaining to the first group to determine whether a preferred access technology may be selected from the first group for a current geographic location of the device.

For example, the extension information may comprise for, each given access technology of the first group listed in the main database, at least one extension bit identifying the given access technology. In one embodiment, the first group may comprise 3GPP2 technologies, and the second group may comprise 3GPP technologies. The main database may comprise a PLMN list, and the secondary database may comprise a PRL.

In related aspects, apparatus 1400 may comprise an electrical component 1440 for consulting a mapping table to translate a first identifier for the preferred access technology of the first group to a corresponding second identifier usable for the second group. The first identifier may comprise a SID/NID combination, and the second identifier may comprise an MNC/MCC pair.

In further related aspects, apparatus 1400 may comprise an electrical component 1450 for determining whether or not to select the preferred access technology of the first group based at least in part on a PLMN list in the main database. For example, the PLMN list may comprise a preference order, and apparatus 1400 may comprise an electrical component 1452 for determining whether or not to select the preferred access technology based at least in part on the preference order.

It is noted that apparatus 1400 may optionally include a processor module 1410 having at least one processor, in the case of apparatus 1400 configured as a communication device, rather than as a processor. Processor 1410, in such case, may be in operative communication with components 1420-1495 via a bus 1412 or similar communication coupling. Processor 1410 may effect initiation and scheduling of the processes or functions performed by components 1420-1495.

In related aspects, apparatus 1400 may include a transceiver module 1414. A stand alone receiver and/or stand alone transmitter may be used in lieu of or in conjunction with transceiver 1414. In further related aspects, apparatus 1400 may optionally include an electrical component for storing information, such as, for example, a memory device/module 1416. Computer readable medium or memory device/module 1416 may be operatively coupled to the other components of apparatus 1400 via bus 1412 or the like. The computer readable medium or memory device 1416 may be adapted to store computer readable instructions and data for effecting the processes and behavior of components 1420-1495, and subcomponents thereof, or processor 1410, or the methods disclosed herein. Memory module 1416 may retain instructions for executing functions associated with electrical components 1420-1495. While shown as being external to memory 1416, it is to be understood that electrical components 1420-1495 can exist within memory 1416.

In accordance with one or more aspects of the embodiments described herein, the above described techniques for system selection may be characterized according to one of several categories. The first technique may be described as implementing a PLMN database for selection with a 3GPP2 acquisition table, assuming cdma2000 MCC/MNC broadcasting.

The second technique may be described as addition of a SID/NID and/or Subnet-ID to a MCC/MNC mapping table, or vice versa, and/or an association table (to support Hybrid 1x/DO). The third technique may be described as using PLMN database only with a single 3GPP2 entry per country pointing to the PRL for 3GPP2-wide selection (i.e., limited or no interleaving).

The fourth technique may be described as implementing a PLMN database to use a PRL for system selection when camped on 3GPP2 system. This technique may involve including a SID/NID pair or Subnet-ID in a MCC/MNC mapping table, or vice versa. This technique may also involve conducing background scans when in 3GPP2, including 3GPP scans.

The fifth technique may be described as using a PLMN database for system selection, wherein all features of a PRL, except for system priorities, are used (e.g. associated DO, acquisition table). This technique may also involve including a SID/NID pair or Subnet-ID in a MCC/MNC mapping table, or vice versa.

Figure 15A:
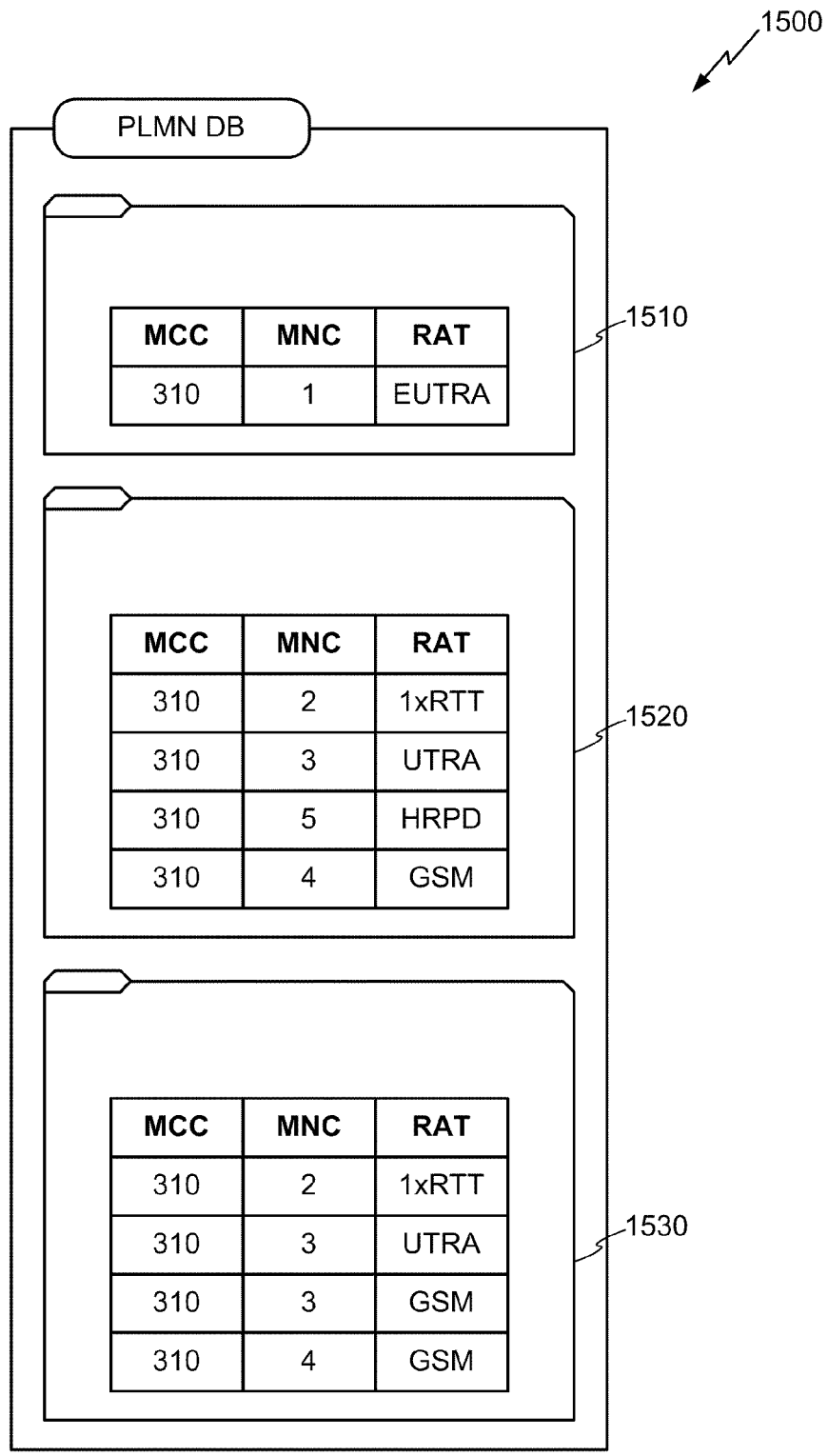
FIG. 15A shows one embodiment of a flex GEO table.

The sixth technique may be described as implementing enhancements to a PLMN database, by essentially adding the PRL concepts in a separate enhanced PLMN database that remains backward compatible. In related aspects, the PRL concepts may be introduced into the 3GPP system selection methodology. The basic idea is to create a new system priority list which is not global, but rather geo-spatial specific for a particular region. For example, this new flex GEO list may be a separate list, apart from the PLMN list. With reference to FIG. 15A, there is shown one embodiment of a flex GEO table 1500 that includes three lists 1510, 1520, and 1530, each for a particular geographic region. There can be several ways of "pointing" to the flex GEO table. In one approach, a bit from the reserved bits in the ATI (RAT bitmap) serves as a pointer to a 3GPP "PRL". A preferred approach involves simply including the new flex GEO table without any changes to the PLMN list (i.e. no need to take a bit).

Figure 15B:
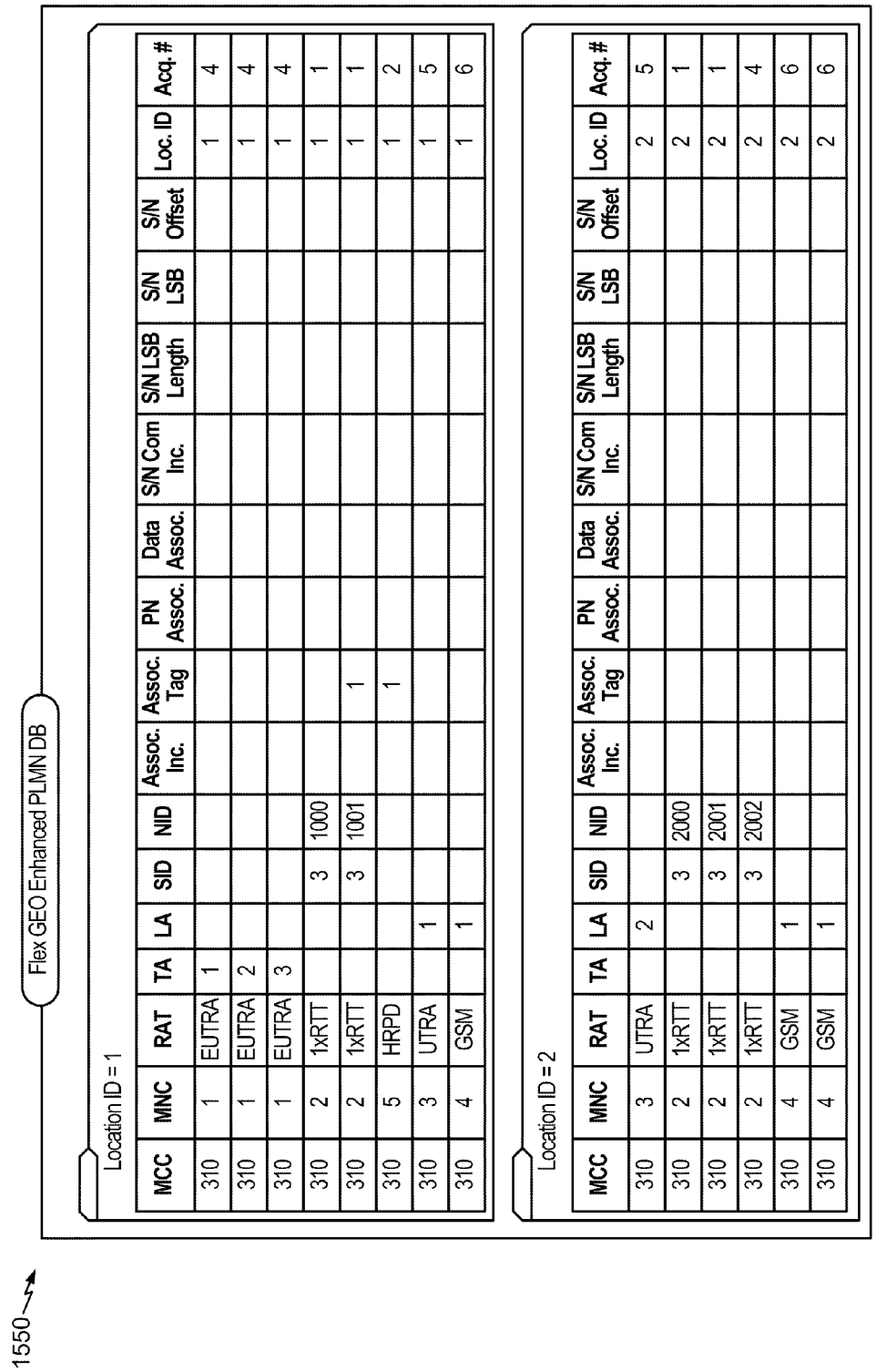
FIG. 15B shows one embodiment of a system table that may be used with a flex GEO table of FIG. 15A.

In related aspects, the flex GEO table may comprise a system table and an acquisition table, or variations thereof. With reference to FIG. 15B, there is shown one embodiment of a system table 1550 that may be used with the flex GEO table. With reference to FIG. 15C, there is shown one embodiment of an acquisition table 1570 that may be used with the flex GEO table. Acquisition table 1570 may contain numerous parameters, such as, for example, acquisition index, bandclass, channel, and other optional fields to support OFDM, CDMA, or the like. In one approach, one or more of the following may be used for prioritizing the systems/networks to be selected: GEO; index to a scan table (if extra efficient scans are desired); and additional priority data/info (if supporting multiple systems with the same priority level).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, means, and steps have been described above generally in terms of their functionality. Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium (not shown) may be coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. It is noted that the word "exemplary" is used exclusively herein to mean "serving as an example, instance, or illustration." Any example described herein as "exemplary" is not necessarily to be construed as preferred or advantageous over other examples.

What is claimed is:

1. A method for system selection from a plurality of wireless system access technologies, the plurality comprising a first group and a second group, comprising:

storing identification information pertaining to the first group as part of identification information pertaining to the second group in a list of public land mobile networks, the list of public land mobile networks concerning priorities of ones of the access technologies pertaining to the second group, wherein the storing comprises having, for each system in the first group, at least one identifier bit in an access technology identifier of the second group in the list of public land mobile networks, wherein the at least one identifier bit identifies at least one network corresponding to the first group; and selecting a preferred access technology from one of the first and second groups based at least in part on the identification information stored in the list of public land mobile networks.

2. The method of claim 1, wherein the list of public land mobile networks comprises a list structure for prioritizing access technologies from at least one of the first group and the second group, and the at least one extension bit indicates that the priorities apply to the access technologies of the first group.

3. The method of claim 2, wherein the first group comprises 3rd Generation Partnership Project 2 technologies and the second group comprises 3rd Generation Partnership Project technologies.

4. The method of claim 3, wherein the list of public land mobile networks is associated with the 3rd Generation Partnership Project technologies.

5. The method of claim 4, further comprising accessing a preferred roaming list associated with the 3rd Generation Partnership Project 2 technologies, the preferred roaming list comprising a system table and an acquisition table, the system table of the preferred roaming list comprising at least one system identifier network identifier combination for at least one of the 3rd Generation Partnership Project 2 technologies.

6. The method of claim 5, further comprising adapting the system table of the preferred roaming list to include at least one mobile country code mobile network code pair for at least one of the 3rd Generation Partnership Project 2 technologies and in response obtaining a corresponding acquisition index from the system table for a given mobile country code mobile network code pair in the system table, the acquisition index referring to at least one frequency listed in the acquisition table.

7. The method of claim 5, further comprising adapting the list of the public land mobile networks to include at least one mobile country code mobile network code pair for at least one of the 3rd Generation Partnership Project 2 technologies.

8. The method of claim 7, wherein using the at least one mobile country code mobile network code pair comprises checking a mapping table that correlates mobile country code mobile network code pairs to corresponding system identifier network identifier combinations.

9. The method of claim 5, further comprising receiving at least one mobile country code mobile network code pair in at least one extended system parameter message from at least one 3rd Generation Partnership Project 2 system.

10. The method of claim 5, further comprising using a system identifier network identifier combination in the preferred roaming list to find a corresponding mobile country code mobile network code pair by checking a mapping table that correlates system identifier network identifier combinations to corresponding mobile country code mobile network code pairs.

11. The method of claim 5, wherein:
the selected preferred access technology corresponds to at least one 3rd Generation Partnership Project 2 system;
the at least one 3rd Generation Partnership Project 2 system is not associated with mobile country code mobile network code pairs; and
the list of public land mobile networks comprises at least one block entry corresponding to the 3rd Generation Partnership Project 2 technologies.

12. The method of claim 11, further comprising, in response to encountering the at least one block entry, (a) performing a full preferred roaming list scan to search for all available 3rd Generation Partnership Project 2 technologies and (b) camping on an available 3rd Generation Partnership Project 2 system.

13. The method of claim 5, further comprising using geographical region indicators and acquisition records listed in the preferred roaming list to speed up scans for 3rd Generation Partnership Project 2 systems that are included in the list of the public land mobile networks.

14. A method for system selection from a plurality of wireless system access technologies, the plurality comprising a first group and a second group, comprising:
storing extension information concerning the first group as part of identification information pertaining to the second group in a list of public land mobile networks, wherein the storing comprises having, for each system in the first group, at least one identifier bit in an access technology identifier of the second group in the list of public land mobile networks, wherein the at least one identifier bit identifies at least one network corresponding to the first group; and
searching a secondary database concerning priorities of ones of the access technologies pertaining to the first group to determine whether a preferred access technology may be selected from the first group for a current geographic location of a user equipment.

15. The method of claim 14, further comprising consulting a mapping table to translate a first identifier for the preferred access technology of the first group to a corresponding second identifier usable for the second group.

16. A communication device for system selection from a plurality of wireless system access technologies, the plurality comprising a first group and a second group, comprising:
a transceiver module;
at least one processor operatively coupled with the transceiver module; and
a memory module operatively coupled with the at least one processor and comprising executable code for the at least one processor to:
store identification information pertaining to the first group as part of identification information pertaining to the second group in a list of public land mobile networks, the list of public land mobile networks concerning priorities of ones of the access technologies pertaining to the second group, wherein the storing comprises having, for each system in the first group, at least one identifier bit in an access technology identifier of the second group in the list of public land mobile networks, wherein the at least one identifier bit identifies at least one network corresponding to the first group; and
select a preferred access technology from one of the first and second groups based at least in part on the identification information stored in the list of public land mobile networks.

17. The device of claim 16, wherein the list of public land mobile networks comprises a list structure for prioritizing access technologies from at least one of the first group and the second group, and the at least one extension bit indicates support of that the priorities apply to the access technologies of the first group.

18. The device of claim 17, wherein the first group comprises 3rd Generation Partnership Project 2 technologies and the second group comprises 3rd Generation Partnership Project technologies, and the list of public land mobile networks is associated with the 3rd Generation Partnership Project technologies.

19. The device of claim 18, wherein the at least one processor accesses a preferred roaming list associated with the 3rd Generation Partnership Project 2 technologies, the preferred roaming list comprising a system table and an acquisition table, the system table of the preferred roaming list comprises at least one system identifier network identifier combination for at least one of the 3rd Generation Partnership Project 2 technologies.

20. The device of claim 19, wherein, in response to the system table of the preferred roaming list being adapted to include at least one mobile country code mobile network code pair for at least one of the 3rd Generation Partnership Project 2 technologies, the at least one processor obtains a corresponding acquisition index from the system table for a given mobile country code mobile network code pair in the system table, the acquisition index referring to at least one frequency listed in the acquisition table.

21. The device of claim 20, wherein the at least one processor, for a given mobile country code mobile network code pair in the system table, obtains a corresponding acquisition index from the system table, the acquisition index referring to at least one frequency listed in the acquisition table.

22. The device of claim 19, wherein the at least one processor further adapts the list of the public land mobile networks to include at least one mobile country code mobile network code pair for at least one of the 3rd Generation Partnership Project 2 technologies.

23. The device of claim 19, wherein the transceiver module receives at least one mobile country code mobile network code pair in at least one extended system parameter message from at least one 3rd Generation Partnership Project 2 system.

24. The device of claim 19, wherein the at least one processor uses at least one of a system identifier network identifier combination and a subnet-identification in the preferred roaming list to find at least one corresponding mobile country code mobile network code pair by checking a mapping table.

25. The device of claim 19, wherein:
the selected preferred access technology corresponds to at least one 3rd Generation Partnership Project 2 system;
the at least one 3rd Generation Partnership Project 2 system is not associated with mobile country code mobile network code pairs; and
the list of public land mobile networks comprises at least one block entry corresponding to the 3rd Generation Partnership Project 2 technologies.

26. The device of claim 25, wherein the at least one processor, in response to encountering the at least one block entry, (a) performs a full preferred roaming list scan to search for all available 3rd Generation Partnership Project 2 technologies and (b) camps on an available 3rd Generation Partnership Project 2 system.

27. The device of claim 19, wherein the at least one processor uses geographical region indicators and acquisition records listed in the preferred roaming list to speed up scans for 3rd Generation Partnership Project 2 systems that are included in the list of the public land mobile networks.

28. A communication device for system selection from a plurality of wireless system access technologies, the plurality comprising a first group and a second group, comprising:
a transceiver module;
at least one processor operatively coupled with the transceiver module; and
a memory module operatively coupled with the at least one processor and comprising executable code for the at least one processor to:
store extension information concerning the first group as part of identification information pertaining to the second group in a list of public land mobile networks, wherein the storing comprises having, for each system in the first group, at least one identifier bit in an access technology identifier of the second group in the list of public land mobile networks, wherein the at least one identifier bit identifies at least one network corresponding to the first group; and
search a secondary database concerning priorities of ones of the access technologies pertaining to the first group to determine whether a preferred access technology may be selected from the first group for a current geographic location of the communication device.

29. The communication device of claim 28, wherein the at least one processor consults a mapping table to translate a first identifier for the preferred access technology of the first group to a corresponding second identifier usable for the second group.

30. An apparatus for system selection from a plurality of wireless system access technologies, the plurality comprising a first group and a second group, comprising:
a first component for storing identification information pertaining to the first group as part of identification information pertaining to the second group in a list of public land mobile networks, the list of public land mobile networks concerning priorities of ones of the access technologies pertaining to the second group, wherein the storing comprises having, for each system in the first group, at least one identifier bit in an access technology identifier of the second group in the list of public land mobile networks, wherein the at least one identifier bit identifies at least one network corresponding to the first group; and
a second component for selecting a preferred access technology from one of the first and second groups based at least in part on the identification information stored in the list of public land mobile networks.

31. The apparatus of claim 30, wherein the identification information indicates that the priorities apply to the access technologies of the first group.

32. The apparatus of claim 30, wherein the first group comprises 3rd Generation Partnership Project 2 technologies and the second group comprises 3rd Generation Partnership Project technologies.

33. An apparatus for system selection from a plurality of wireless system access technologies, the plurality comprising a first group and a second group, comprising:
a first component for storing extension information concerning the first group as part of identification information pertaining to the second group in a list of public land mobile networks, wherein the storing comprises having, for each system in the first group, at least one identifier bit in an access technology identifier of the second group in the list of public land mobile networks, wherein the at least one identifier bit identifies at least one network corresponding to the first group; and
a second component for searching a secondary database concerning priority priorities of ones of the access technologies pertaining to the first group to determine whether a preferred access technology may be selected from the first group for a current geographic location of a user equipment.

34. The apparatus of claim 33, wherein the first group comprises 3rd Generation Partnership Project 2 technologies and the second group comprises 3rd Generation Partnership Project technologies.

35. An apparatus for system selection from a plurality of wireless system access technologies, the plurality comprising a first group and a second group, comprising:

means for storing identification information pertaining to the first group as part of identification information pertaining to the second group in a list of public land mobile networks, the list of public land mobile networks concerning priorities of ones of the access technologies pertaining to the second group, wherein the storing comprises having, for each system in the first group, at least one identifier bit in an access technology identifier of the second group in the list of public land mobile networks, wherein the at least one identifier bit identifies at least one network corresponding to the first group; and means for selecting a preferred access technology from one of the first and second groups based at least in part on the identification information stored in the list of public land mobile networks.

36. The apparatus of claim 35, wherein the identification information indicates that the priorities apply to the access technologies of the first group.

37. The apparatus of claim 36, wherein the first group comprises 3rd Generation Partnership Project 2 technologies and the second group comprises 3rd Generation Partnership Project technologies.

38. An apparatus for system selection from a plurality of wireless system access technologies, the plurality comprising a first group and a second group, comprising:

means for storing extension information concerning the first group as part of identification information pertaining to the second group in a list of public land mobile networks, wherein the storing comprises having, for each system in the first group, at least one identifier bit in an access technology identifier of the second group in the list of public land mobile networks, wherein the at least one identifier bit identifies at least one network corresponding to the first group; and means for searching a secondary database concerning priorities of ones of the access technologies pertaining to the first group to determine whether a preferred access technology may be selected from the first group for a current geographic location of a user equipment.

39. The apparatus of claim 38, wherein the first group comprises 3rd Generation Partnership Project 2 technologies and the second group comprises 3rd Generation Partnership Project technologies.

40. A computer program product for system selection from a plurality of wireless system access technologies, the plurality comprising a first group and a second group, comprising:
a non-transitory computer-readable medium comprising:
code for causing a computer to store, as part of identification information pertaining to the second group in a list of public land mobile networks, identification information pertaining to a first group of a plurality of wireless system access technologies, the list of public land mobile networks concerning priorities of ones of plurality pertaining to a second group, wherein the storing comprises having, for each system in the first group, at least one identifier bit in an access technology identifier of the second group in the list of public land mobile networks, wherein the at least one identifier bit identifies at least one network corresponding to the first group; and code for causing a computer to select a preferred access technology from one of the first and second groups based at least in part on the identification information stored in the list of public land mobile networks.

41. The computer program product of claim 40, wherein the identification information indicates that the priorities apply to the access technologies of the first group.

42. The computer program product of claim 40, wherein the first group comprises 3rd Generation Partnership Project 2 technologies and the second group comprises 3rd Generation Partnership Project technologies.

43. A computer program product for system selection from a plurality of wireless system access technologies, the plurality comprising a first group and a second group, comprising:

a non-transitory computer-readable medium comprising:

code for causing a computer to store, as part of identification information pertaining to the second group in a list of public land mobile networks, extension information concerning a first group of a plurality of wireless system access technologies, wherein the storing comprises having, for each system in the first group, at least one identifier bit in an access technology identifier of the second group in the list of public land mobile networks, wherein the at least one identifier bit identifies at least one network corresponding to the first group; and code for causing a computer to search a secondary database concerning priorities of ones of the access technologies pertaining to the first group to determine whether a preferred access technology may be selected from the first group for a current geographic location of a user equipment.

44. The computer program product of claim 43, wherein the computer-readable medium further comprises code for causing a computer to consult a mapping table to translate a first identifier for the preferred access technology of the first group to a corresponding second identifier usable for the second group.

* * * * *